(12) United States Patent
Shirakabe et al.

(10) Patent No.: US 8,041,311 B2
(45) Date of Patent: Oct. 18, 2011

(54) RADIO COMMUNICATION CONTROL APPARATUS AND RADIO COMMUNICATION CONTROL METHOD

(75) Inventors: Masashige Shirakabe, Yokohama (JP); Takahiro Asai, Yokosuka (JP); Naoto Matoba, Fujisawa (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1075 days.

(21) Appl. No.: 11/851,873

(22) Filed: Sep. 7, 2007

(65) Prior Publication Data

US 2008/0062896 A1    Mar. 13, 2008

(30) Foreign Application Priority Data

Sep. 8, 2006  (JP) ................. P2006-244590

(51) Int. Cl.
*H04B 1/44* (2006.01)
*H04B 7/005* (2006.01)

(52) U.S. Cl. ......................... 455/83; 370/278
(58) Field of Classification Search .............. 455/83, 455/78, 553.1, 452.2, 73; 370/278, 282
See application file for complete search history.

(56) References Cited

U.S. PATENT DOCUMENTS

| | | | |
|---|---|---|---|
| 5,691,978 A | 11/1997 | Kenworthy | |
| 2004/0142700 A1 | 7/2004 | Marinier | |
| 2004/0233888 A1 | 11/2004 | Bonta et al. | |
| 2006/0023649 A1 | 2/2006 | Tillet et al. | |

FOREIGN PATENT DOCUMENTS

| | | |
|---|---|---|
| EP | 0 841 763 A1 | 5/1998 |
| EP | 1 117 184 A1 | 7/2001 |
| EP | 1 246 492 A1 | 10/2002 |
| EP | 1 670 277 A1 | 6/2006 |
| GB | 2 418 806 A | 4/2006 |
| JP | 8-223106 | 8/1996 |
| JP | 11-285061 | 10/1999 |
| JP | 2000-13858 | 1/2000 |
| JP | 2002-95065 | 3/2002 |
| JP | 2004-32210 | 1/2004 |
| JP | 2004-112761 | 4/2004 |
| JP | 2005-101716 | 4/2005 |
| WO | WO 96/38938 A2 | 12/1996 |
| WO | WO 96/38938 A3 | 12/1996 |
| WO | WO 02/063786 A1 | 8/2002 |

*Primary Examiner* — Eugene Yun
(74) *Attorney, Agent, or Firm* — Oblon, Spivak, McClelland, Maier & Neustadt, L.L.P.

(57) ABSTRACT

To provide a radio communication control apparatus and a radio communication control method capable of controlling simultaneous transmission and reception so as not to degrade system throughput.
A simultaneous transmission and reception controller 106 determines whether the simultaneous transmission and reception using the same frequency are possible, based on radio spectrum environment information of an opposite party of communication and radio spectrum environment information of a self-apparatus. When the simultaneous transmission and reception using the same frequency are determined to be possible, a control signal transmission section 109 transmits instruction information, indicating that the simultaneous transmission and reception are possible, and a transmission parameter thereof, to the above communication terminal. After the transmission parameter is set, a communication section 111 executes simultaneous transmission and reception with the above communication terminal using the same frequency, when the simultaneous transmission and reception using the same frequency are determined to be possible.

6 Claims, 15 Drawing Sheets

RADIO COMMUNICATION CONTROL APPARATUS AND RADIO COMMUNICATION CONTROL METHOD

BACKGROUND OF THE INVENTION

1. Field of the Invention

The present invention relates to a radio communication control apparatus and a radio communication control method for performing simultaneous transmission and reception, using the same carrier frequency.

2. Related Background of the Invention

As a transmission/reception multiplexing system in the conventional radio communication such as mobile phone, there have been employed FDD (Frequency Division Duplex) system simultaneously performing transmission and reception using different RF (Radio Frequency) carrier frequencies in uplink and downlink, and TDD (Time Division Duplex) system performing transmission and reception using the same RF carrier frequency but in different time slots for the transmission and reception (for example, refer to Japanese Patent Application Laid-open No. 2000-13858). Also, in a wireless LAN, etc., CSMA/CA (Carrier Sense Multiple Access/Collision Avoidance) system is employed, in which communication on the same RF carrier frequency is performed after confirming, by utilizing received signal power, that no communication is being performed in the surroundings using the RF carrier frequency concerned. From the viewpoint of multiplexing the transmission and reception, CSMA/CA system uses different time segments between transmission and reception.

Meanwhile, to further improve spectrum efficiency, a simultaneous transmission and reception method is under study, in which transmission and reception are performed in the same time segment (time slot) using the same RF carrier frequency. Here, in the simultaneous transmission and reception method for simultaneously performing transmission and reception, a signal transmitted from radio equipment is undesirably received in the same radio equipment, as a coupling loop interference signal. There are two main causes of the above coupling loop interference signal: (1) an interference signal produced by a signal from a transmission RF signal processing section being leaked into a received RF signal processing section because of the incompleteness of a circulator; and (2) an interference signal produced by a transmission signal transmitted from an antenna being received by the same antenna, under the influence of propagation paths with reflection, diffraction, etc. Accordingly, studies of radio equipment are in progress to achieve simultaneous transmission and reception by eliminating interference caused by the coupling loop interference signal, using an interference canceller in the analog domain and/or the digital domain.

However, when performing simultaneous transmission and reception, a received SINR (Signal-to-Interference plus Noise power Ratio) is degraded as compared to the case of not performing simultaneous transmission and reception, even if the interference canceller is employed to cope with the influence of the coupling loop interference signal. Also, transmission quality, such as a throughput performance and a BER (Bit Error Rate) performance, in the uplink and downlink varies depending on both the received SINR, which is determined by the desired signal power and the coupling loop interference signal power in the received signal, and the interference cancelling performance in the interference canceller. Therefore, in the circumstances of a low received SINR with insufficient interference cancellation, simultaneous transmission and reception may possibly deteriorate system throughput performance to a large extent. As a result, the system throughput is degraded as compared to the case of not performing simultaneous transmission and reception, and to the contrary, spectrum efficiency may be deteriorated by the execution of simultaneous transmission and reception.

SUMMARY OF THE INVENTION

Accordingly, in order to solve the aforementioned problem, it is an object of the present invention to provide a radio communication control apparatus and a radio communication control method, capable of controlling simultaneous transmission and reception without degrading system throughput.

In order to solve the aforementioned problem, the radio communication control apparatus according to the present invention includes: a control signal reception unit for receiving control signal from a communication terminal, being an opposite party of communication; a simultaneous transmission and reception determination unit for determining whether or not it is possible to perform simultaneous transmission and reception with the communication terminal using the same frequency, based on the control signal received by the control signal reception unit; a control signal transmission unit for transmitting instruction information indicating that the simultaneous transmission and reception are possible, when the simultaneous transmission and reception with the communication terminal using the same frequency are determined to be possible by the simultaneous transmission and reception determination unit, and for transmitting instruction information indicating that the simultaneous transmission and reception are impossible, when the simultaneous transmission and reception with the communication terminal using the same frequency are determined to be impossible; and a communication unit for executing the simultaneous transmission and reception with the communication terminal using the same frequency, when the simultaneous transmission and reception using the same frequency are determined to be possible by the simultaneous transmission and reception determination unit, and for performing communication processing other than the simultaneous transmission and reception with the communication terminal, when the simultaneous transmission and reception using the same frequency are determined to be impossible.

With the above configuration, by receiving control signal from a communication terminal, being an opposite party of communication, it is possible to determine whether or not the simultaneous transmission and reception with the communication terminal, being the opposite party of communication, using the same frequency can be performed, based on the received control signal. Further, when it is determined that the simultaneous transmission and reception can be performed with the communication terminal using the same frequency, instruction information indicating that the simultaneous transmission and reception can be performed is transmitted to the communication terminal, whereas when it is determined that the simultaneous transmission and reception using the same frequency cannot be performed, instruction information indicating that the simultaneous transmission and reception cannot be performed is transmitted to the communication terminal, and thereafter, when it is determined that the simultaneous transmission and reception using the same frequency can be performed, the simultaneous transmission and reception using the same frequency are performed to the communication terminal, while when it is determined that the simultaneous transmission and reception using the same frequency cannot be performed, it is possible to perform communication processing other than simultaneous transmission and reception using the same frequency, to the communication terminal.

With the arrangement, the simultaneous transmission and reception using the same frequency are not necessarily performed, and it is possible to prevent drastic degradation of the system throughput performance caused by the simultaneous transmission and reception using the same frequency, and to prevent degradation of spectrum efficiency.

Further, preferably, the radio communication control apparatus includes: a parameter decision unit for deciding a transmission parameter suitable for simultaneous transmission and reception using the same frequency, when the simultaneous transmission and reception using the same frequency are determined to be possible by the simultaneous transmission and reception determination unit, and for deciding a transmission parameter suitable for communication processing other than the simultaneous transmission and reception using the same frequency, when the simultaneous transmission and reception using the same frequency are determined to be impossible by the simultaneous transmission and reception determination unit; and a parameter setting unit for setting the transmission parameter decided by the parameter decision unit, wherein the control signal transmission unit transmits to the communication terminal the transmission parameter decided by the parameter decision unit together with instruction information indicating whether or not the simultaneous transmission and reception are possible, and wherein the communication unit performs either simultaneous transmission and reception using the same frequency or communication processing other than the simultaneous transmission and reception using the same frequency, using the transmission parameter decided by the parameter decision unit.

With the above configuration, it is possible to decide the transmission parameter suitable for simultaneous transmission and reception using the same frequency, when it is determined that the simultaneous transmission and reception using the same frequency can be performed, and to decide the transmission parameter suitable for communication processing other than the simultaneous transmission and reception using the same frequency, when it is determined that the simultaneous transmission and reception using the same frequency cannot be performed. Also, it is possible to set the decided transmission parameter, to transmit to the above communication terminal the decided transmission parameter together with instruction information indicating whether or not the simultaneous transmission and reception can be performed, and after the above transmission, to perform either simultaneous transmission and reception using the same frequency or communication processing other than the simultaneous transmission and reception using the same frequency.

With the arrangement, it is possible to set a transmission parameter suitable for either simultaneous transmission and reception using the same frequency or communication processing other than the simultaneous transmission and reception using the same frequency. For example, when performing the simultaneous transmission and reception using the same frequency, a transmission parameter enabling suppression of interference can be set, and the system throughput can be improved.

Further, according to the present invention, preferably, the above simultaneous transmission and reception determination unit determines that the simultaneous transmission and reception are possible when radio spectrum environment information is not smaller than a predetermined value, and determines that the simultaneous transmission and reception are impossible when the radio spectrum environment information is smaller than the predetermined value.

With the above configuration, it is possible to determine that the simultaneous transmission and reception can be performed when the radio spectrum environment information has a predetermined value or more, and to determine that the simultaneous transmission and reception cannot be performed when the radio spectrum environment information is less than a predetermined value. According to the radio spectrum environment, it is possible to decide whether or not the simultaneous transmission and reception using the same frequency can be performed, and to prevent degradation of system throughput.

Further, according to the present invention, preferably, the above simultaneous transmission and reception determination unit determines that the simultaneous transmission and reception are possible when radio spectrum environment information is not smaller than a predetermined value, and further determines whether a transmission signal is a data signal or a control signal when the radio spectrum environment information is smaller than the predetermined value, and determines that the simultaneous transmission and reception are possible, on determining that the transmission signal is a data signal, and determines that the simultaneous transmission and reception are impossible, on determining that the transmission signal is not a data signal.

With the above configuration, it is possible to determine that the simultaneous transmission and reception can be performed when radio spectrum environment information is not smaller than the predetermined value, and when radio spectrum environment information is smaller than the predetermined value, to determine whether the transmission signal is a data signal or a control signal, and when the transmission signal is determined to be a data signal, to determine that the simultaneous transmission and reception can be performed, whereas when the transmission signal is not a data signal, to determine that the simultaneous transmission and reception cannot be performed. Thus, it is possible to decide the possibility/impossibility of simultaneous transmission and reception using the same frequency, according to the transmission signal content. Accordingly, it is possible to perform an appropriate decision corresponding to the transmission signal content, in addition to the radio spectrum environment information, and to prevent degradation of system throughput.

Further, according to the present invention, preferably, the above simultaneous transmission and reception determination unit determines whether or not the simultaneous transmission and reception are possible, based on an evaluation value calculated by multiplying radio spectrum environment information, transmission signal type, and data transmission priority information by respective predetermined coefficients, and by mutually adding.

With the above configuration, it is possible to determine whether or not the simultaneous transmission and reception can be performed, based on the evaluation value calculated by multiplying radio spectrum environment information, transmission signal type, and data transmission priority information by the respective predetermined coefficients, and by mutually adding. Also, it is possible to appropriately decide whether or not the simultaneous transmission and reception can be performed by comprehensively deciding the radio spectrum environment information, the transmission signal type, the priority, etc.

Further, according to the present invention, the radio communication control method includes: a control signal reception step for receiving control signal from a communication terminal, being an opposite party of communication; a simultaneous transmission and reception determination step for, based on the control signal received in the control signal reception step, determining whether or not it is possible to perform simultaneous transmission and reception with the communication terminal using the same frequency; a control signal transmission step for transmitting, to the communication terminal, instruction information indicating that the simultaneous transmission and reception are possible, when the simultaneous transmission and reception with the communication terminal using the same frequency are determined to be possible in the simultaneous transmission and reception determination step, and for transmitting, to the communication terminal, instruction information indicating that the simultaneous transmission and reception are impossible, when the simultaneous transmission and reception using the same frequency are determined to be impossible; and a communication step for executing the simultaneous transmission and reception with the communication terminal using the same frequency, when the simultaneous transmission and reception using the same frequency are determined to be possible in the simultaneous transmission and reception determination step, and for performing communication processing other than the simultaneous transmission and reception with the communication terminal, when the simultaneous transmission and reception using the same frequency are determined to be impossible.

Further, according to the present invention, the radio communication control apparatus includes: an acquisition unit for acquiring radio spectrum environment information indicative of radio spectrum environment of a communication terminal, being an opposite party of communication, and radio spectrum environment information of a self-apparatus; a parameter decision unit for deciding a spreading factor in a transmission signal among transmission parameters, based on the radio spectrum environment information acquired by the acquisition unit; a control signal transmission unit for transmitting the transmission parameter decided by the parameter decision unit, to the communication terminal; a parameter setting unit for setting the transmission parameter decided by the parameter decision unit; and a communication unit for performing simultaneous transmission and reception with the communication terminal using the same frequency, using the transmission parameter set by the setting unit.

With the above configuration, it is possible to acquire radio spectrum environment information indicative of the radio spectrum environment of the communication terminal of the opposite party, and the radio spectrum environment information of the self-apparatus, and to decide a spreading factor in a transmission signal among transmission parameters, based on the acquired radio spectrum environment information. Further, it is possible to transmit the transmission parameter to the above communication terminal, and to set the decided transmission parameter, and to perform simultaneous transmission and reception using the same frequency with the above communication terminal, using the set transmission parameter. As a result, it is possible to reduce coupling loop interference at the time of simultaneous transmission and reception using the same frequency, and to prevent degradation of the received signal quality.

Further, according to the present invention, preferably, the above parameter decision unit decides a transmission power of a transmission signal according to the radio spectrum environment information, so as to decide as a transmission parameter.

With the above configuration, it is possible to decide the transmission power of the transmission signal according to the radio spectrum environment information, so as to decide as the transmission parameter, and it is possible to reduce coupling loop interference at the time of simultaneous transmission and reception using the same frequency, and to prevent degradation of the received signal quality.

Further, according to the present invention, the radio communication control method includes: an acquisition step for acquiring radio spectrum environment information indicative of radio spectrum environment of a communication terminal, being an opposite party of communication, and radio spectrum environment information of a self-apparatus; a parameter decision step for deciding a spreading factor in a transmission signal among transmission parameters, based on the radio spectrum environment information acquired in the acquisition step; a control signal transmission step for transmitting the transmission parameter decided in the parameter decision step, to the communication terminal; a parameter setting step for setting the transmission parameter decided in the parameter decision step; and a communication step for performing simultaneous transmission and reception using the same frequency with the communication terminal, using the transmission parameter set in the setting step.

Further, according to the present invention, the radio communication control apparatus includes: an acquisition unit for acquiring traffic priority information indicative of a priority to a transmission signal in a communication terminal, being an opposite party of communication, and traffic priority information of a self-apparatus; a parameter decision unit for deciding a spreading factor in a transmission signal among transmission parameters, based on the traffic priority information acquired by the acquisition unit; a control signal transmission unit for transmitting the transmission parameter decided by the parameter decision unit, to the communication terminal; a parameter setting unit for setting the transmission parameter decided by the parameter decision unit; and a communication unit for performing simultaneous transmission and reception with the communication terminal using the same frequency using the transmission parameter set by the setting unit.

With the above configuration, it is possible to acquire the traffic priority information indicative of the priority to the transmission signal in the communication terminal of the opposite party, and the traffic priority information of the self-apparatus, and to decide the spreading factor in the transmission signal among the transmission parameters, based on the acquired traffic priority information. Further, it is possible to transmit the decided transmission parameter to the communication terminal of the opposite party, and to set the decided transmission parameter, and to perform simultaneous transmission and reception using the same frequency with the communication terminal, using the set transmission parameter. As a result, it is possible to set a transmission parameter depending on a necessary degree of reliability on the transmission signal, according to the traffic priority information indicative of the transmission signal type or the priority, and it is possible to reduce coupling loop interference at the time of simultaneous transmission and reception using the same frequency, and to prevent degradation of the receiving signal quality.

Further, according to the present invention, preferably, the above parameter decision unit decides the transmission power of the transmission signal according to the traffic priority information, so as to decide as a transmission parameter.

With the above configuration, it is possible to decide the transmission power of the transmission signal according to the traffic priority information, which is decided to be as the transmission parameter, and it is possible to reduce coupling loop interference at the time of simultaneous transmission and reception using the same frequency, and to prevent degradation of the receiving signal quality.

Further, according to the present invention, a radio communication control method includes: an acquisition step for acquiring traffic priority information indicative of a priority to a transmission signal in a communication terminal, being an opposite party of communication, and traffic priority information of a self-apparatus; a parameter decision step for deciding a spreading factor in a transmission signal among transmission parameters, based on the traffic priority information acquired in the acquisition step; a control signal transmission step for transmitting the transmission parameter decided in the parameter decision step, to the communication terminal; a parameter setting step for setting the transmission parameter determined in the parameter decision step; and a communication step for performing simultaneous transmission and reception with the communication terminal using the same frequency, using the transmission parameter set in the setting step.

According to the present invention, it is determined whether simultaneous transmission and reception using the same frequency are to be performed according to the surrounding radio spectrum environment such as interference, and according to the above determination result, the simultaneous transmission and reception using the same frequency can be performed, and thus, the system throughput can be improved.

BRIEF DESCRIPTION OF THE DRAWINGS

FIG. 7 is a sequence diagram illustrating the processing of the radio communication control apparatus 100a and the radio communication control apparatus 200a.

DESCRIPTION OF THE PREFERRED EMBODIMENTS

The present invention may readily be understood by considering the following detailed description, referring to the attached drawings illustrated for one embodiment. Subsequently, referring to the attached drawings, the embodiment of the present invention will be described. In case of possibility, with like numerals referring to like parts, the duplication of description is omitted.

First Embodiment

Figure 1:
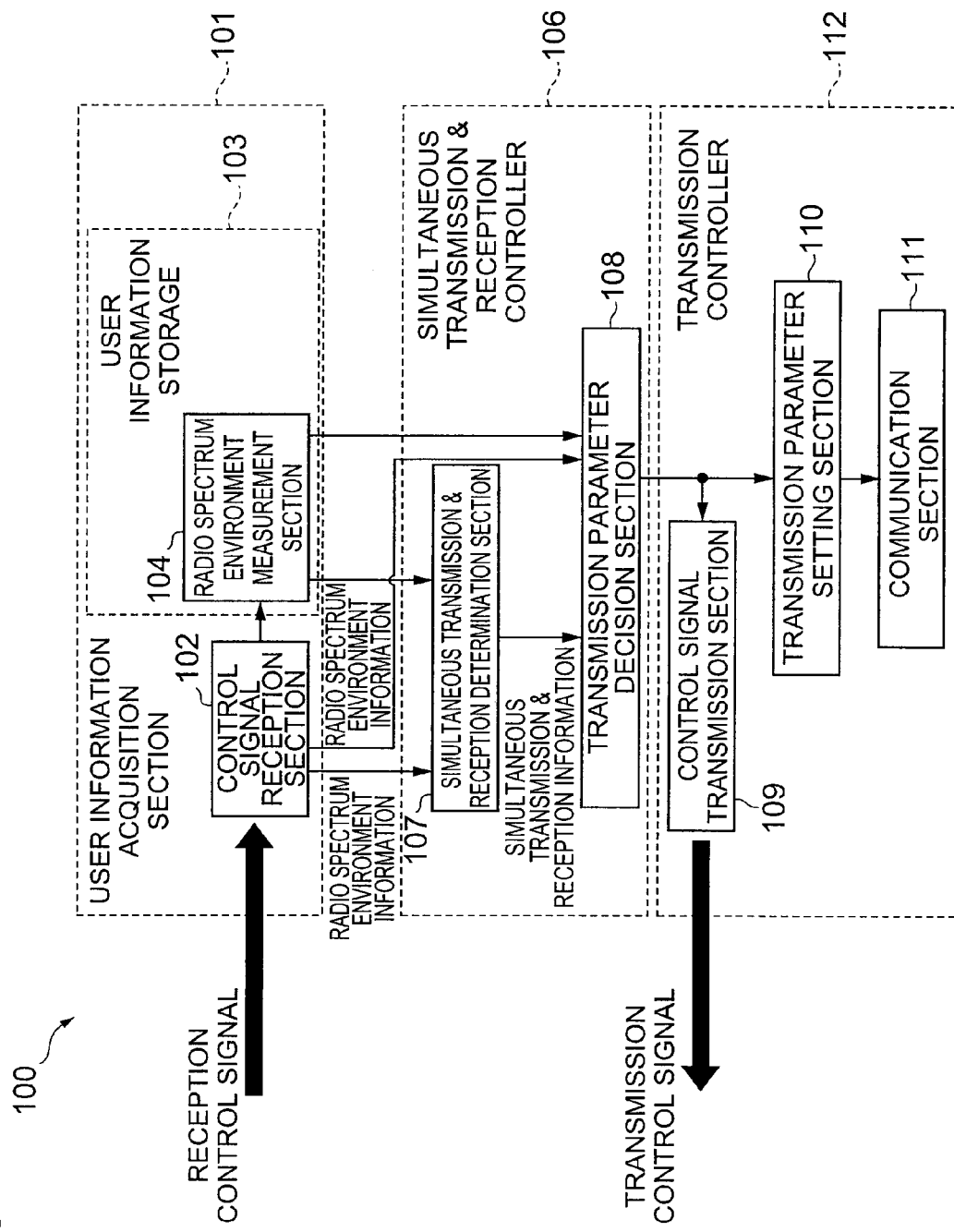
FIG. 1 is a block diagram of a radio communication control apparatus 100 according to a first embodiment.

First, there will be described a radio communication control apparatus 100 according to a first embodiment. FIG. 1 is a block diagram of the radio communication control apparatus 100. The radio communication control apparatus 100 includes a user information acquisition section 101 [control signal reception section 102 (control signal reception unit)], user information storage 103 (radio spectrum environment measurement section 104), simultaneous transmission & reception controller 106 and transmission controller 112. Here, the simultaneous transmission & reception controller 106 includes a simultaneous transmission & reception determination section 107 (simultaneous transmission and reception determination unit) and a transmission parameter decision section 108 (parameter decision unit), and the transmission controller 112 includes control signal transmission section 109 (control signal transmission unit), transmission parameter setting section 110 (parameter setting unit), and communication section 111 (communication unit). Hereinafter, each configuration element will be described.

The user information acquisition section 101 is a portion which acquires both the user information of the radio communication control apparatus 100, which is self-apparatus, and the user information of second radio equipment, which is to be an opposite party. The control signal reception section 102 of the above user information acquisition section 101 receives radio spectrum environment information of the self-apparatus, being measured in the second radio equipment, and a pilot signal, etc. from the second radio equipment. The radio spectrum environment measurement section 104 measures SINR of radio spectrum propagation environment of the above second radio equipment, using the pilot signal received from the second radio equipment of the communication opposite party, and thereby acquires the user information which is radio spectrum environment information of both the self-apparatus and the communication opposite party. Here, the measurement with the radio spectrum environment measurement section 104 represents theoretical estimation of the radio spectrum environment by, for example, averaging a calculation value obtained based on the sampled result of the signal transmitted from the second radio equipment, such as the pilot signal.

As described above, the user information at least includes the radio spectrum environment information, i.e. the information of a surrounding radio spectrum propagation environment of the radio equipment, being measured using the received signal (for example, pilot signal). The user information may include possibility/impossibility information of simultaneous transmission and reception representing whether or not the second radio equipment of the opposite party has simultaneous transmission and reception function.

The simultaneous transmission & reception controller 106 is a portion of performing control in regard to simultaneous transmission and reception, using the user information obtained by the user information acquisition section 101. Specifically, the simultaneous transmission & reception determination section 107 is a portion which inputs both the radio spectrum environment information of the self-apparatus, received by the control signal reception section 102 and the radio spectrum environment information of the opposite party being measured in the radio spectrum environment measurement section 104, and determines whether or not simultaneous transmission and reception using the same frequency are possible, by determining whether or not the above two sets of radio spectrum environment information has a predetermined threshold or greater. When the both two sets of the input radio spectrum environment information are greater than, and inclusive of, the threshold, the above simultaneous transmission & reception determination section 107 determines that the simultaneous transmission and reception using the same frequency are possible, while when either one of the two sets of the input radio spectrum environment information is smaller than the threshold, it is determined that the simultaneous transmission and reception using the same frequency are impossible.

The transmission parameter decision section 108 is a portion which decides transmission parameters being set based on the determination result from the simultaneous transmission & reception determination section 107. For example, the transmission parameter decision section 108 can decide transmission parameters such as transmission power, spreading factor, error correction coding scheme, modulation scheme, etc. When the simultaneous transmission and reception are determined to be possible, the transmission parameter decision section 108 decides the transmission parameters to a direction of increasing interference tolerance of the transmission signal, such as increasing the spreading factor, decreasing the coding rate of error correction coding, decreasing the multilevel number of the modulation in the modulation scheme. Also, as to the transmission power, it is controlled to increase the transmission power. However, if the increase is made in a straight sense, there is a possibility that the coupling loop interference signal power increases, that radio spectrum environment on the opposite side deteriorates, and that a received SINR of the signal transmitted from the opposite party deteriorates. Therefore, it is preferable to control the transmission power depending on a transmission signal to be transmitted.

According to the present embodiment, since the radio spectrum environment information being measured in the radio spectrum environment measurement section 104 indicates the radio spectrum environment at the opposite party in case that the signal transmitted from the opposite party is received by the self-apparatus, it is necessary for the radio communication control apparatus 100 to decide transmission parameters (for example, spreading factor, etc.) adapted to the above radio spectrum environment information, and to transmit to the opposite party so that the opposite party can set the above parameters as transmission parameters for use at the time of transmission. Further, in the radio communication control apparatus 100, corresponding to the radio spectrum environment information of the self-apparatus received in the control signal reception section 102, which is obtained when the opposite party receives a signal transmitted from the self-apparatus, it is necessary to decide transmission parameters, so as to be set by the transmission parameter setting section 110. In other words, preferably, transmission parameters appropriate to each radio spectrum environment are set in each of the both radio communication control apparatuses.

The transmission controller 112 is a portion for performing transmission control, and has the following configuration.

The control signal transmission section 109 is a portion which transmits transmission parameters for performing simultaneous transmission and reception, being output from the simultaneous transmission & reception controller 106, to the second radio equipment as control signal. Also, the control signal transmission section 109 transmits a pilot signal for measuring in the second radio equipment the radio spectrum environment in case that a signal transmitted from the radio communication control apparatus 100, that is, the self-apparatus, is received in the second radio equipment.

The transmission parameter setting section 110 is a portion which sets the transmission parameters being output from the simultaneous transmission & reception controller 106, as transmission parameters of the radio communication control apparatus 100, the first radio equipment.

The communication section 111 performs simultaneous transmission and reception using the same frequency, using the transmission parameters set by the transmission parameter setting section 110.

The radio communication control apparatus 100 thus configured performs the determination of simultaneous transmission and reception, based on the radio spectrum environment information when the signal transmitted from the self-apparatus is received in the second radio equipment and measured in the second radio equipment, the opposite party, and also the radio spectrum environment information when the signal transmitted from the second radio equipment is received in the self-apparatus and measured by the self-apparatus. When the simultaneous transmission and reception are possible, the transmission parameters suitable for the simultaneous transmission and reception are set, so that transmission/reception operation can be performed using the above parameters. Here, in place of the radio spectrum environment information, it may be possible to receive, from the second radio equipment, information indicating whether the simultaneous transmission and reception are possible, and using the above information, to determine the possibility/impossibility of the simultaneous transmission and reception.

Figure 2:
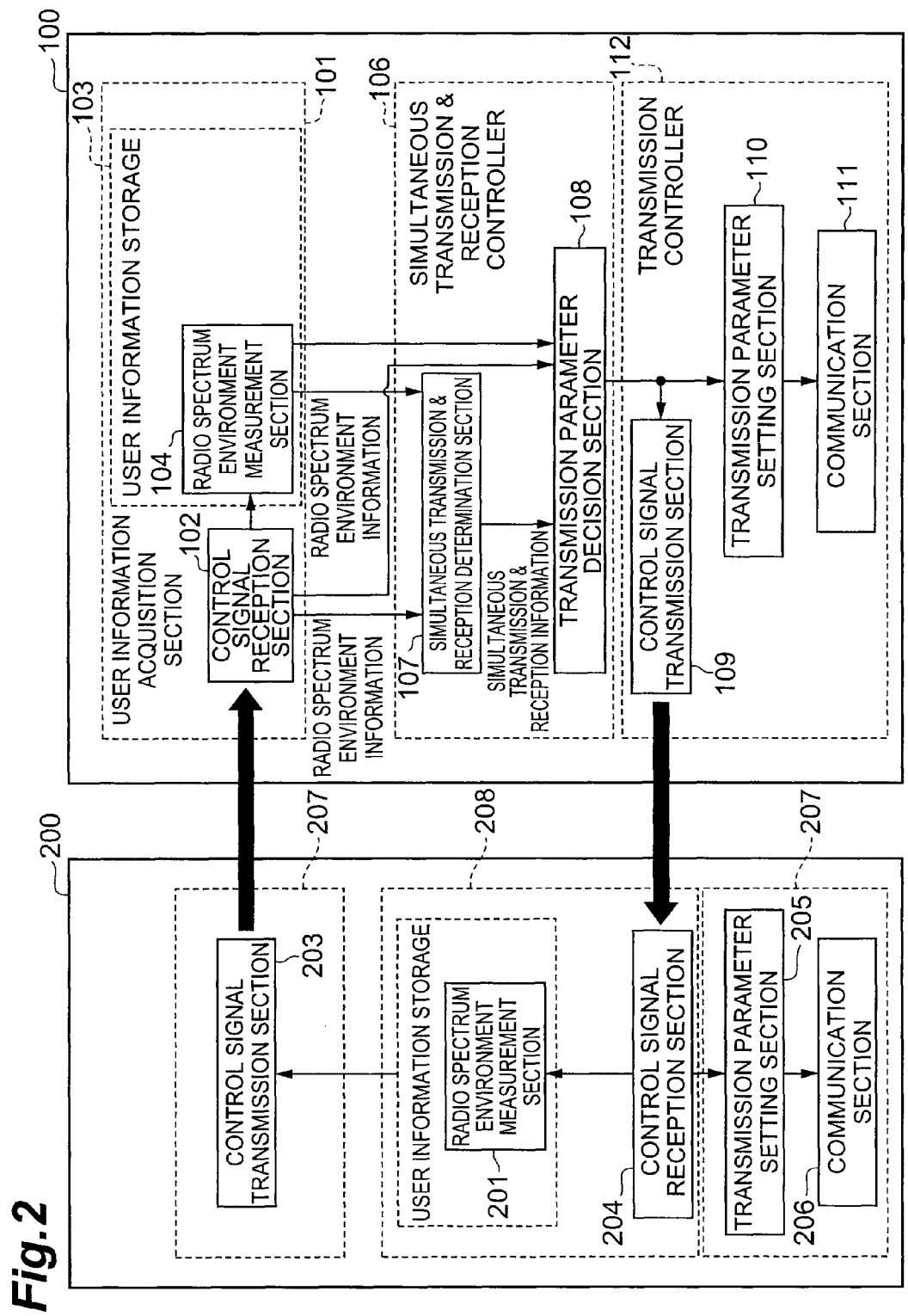
FIG. 2 is a block diagram of a radio communication control apparatus 200 according to the first embodiment.

A radio communication control apparatus 200 indicative of second radio equipment, an opposite party of the above radio communication control apparatus 100, will be described. FIG. 2 is a block diagram of the radio communication control apparatus 200. The radio communication control apparatus 200, which is a second radio equipment, includes a transmission controller 207 and a reception controller 208. The transmission controller 207 has a control signal transmission section 203, a transmission parameter setting section 205 and a communication section 206, while the reception controller 208 has a radio spectrum environment measurement section 201 and a control signal reception section 204. Hereinafter, each configuration element will be described.

First, the radio spectrum environment measurement section 201 and the control signal reception section 204 in the reception controller 208 will be described.

The radio spectrum environment measurement section 201 is a portion which measures SINR, radio spectrum environment information, based on a signal (for example, pilot signal) transmitted from the radio communication control apparatus 100, prior to the simultaneous transmission and reception.

The control signal reception section 204 is a portion which receives the pilot signal transmitted from the radio communication control apparatus 100, and outputs to the above-mentioned radio spectrum environment measurement section 201. Further, when the transmission parameters are transmitted from the radio communication control apparatus 100, the control signal reception section 204 outputs the above parameters to the transmission parameter setting section 205, so as to be set as transmission parameters.

Next, the control signal transmission section 203, the transmission parameter setting section 205 and the communication section 206 in the transmission controller 207 will be described.

The control signal transmission section 203 is a portion which transmits the pilot signal for measuring the radio spectrum environment information, to the radio communication control apparatus 100. Also, the control signal transmission section 203 is a portion which transmits to the radio communication control apparatus 100 the radio spectrum environment information measured in the radio spectrum environment measurement section 201, that is, the radio spectrum environment information of the radio communication control apparatus 100 when a signal is transmitted from the radio communication control apparatus 100 and received in the radio communication control apparatus 200.

The transmission parameter setting section 205 is a portion which sets the transmission parameters output from the reception controller 208.

The communication section 206 is a portion which executes simultaneous transmission and reception with the radio communication control apparatus 100, according to the transmission parameters set in the transmission parameter setting section 205.

As such, simultaneous transmission and reception using the same frequency can be performed by measuring the radio spectrum environment based on the pilot signal transmitted from the radio communication control apparatus 100, transmitting to the radio communication control apparatus 100 as radio spectrum environment information, and receiving and setting the transmission parameters transmitted from the radio communication control apparatus 100.

Figure 3:
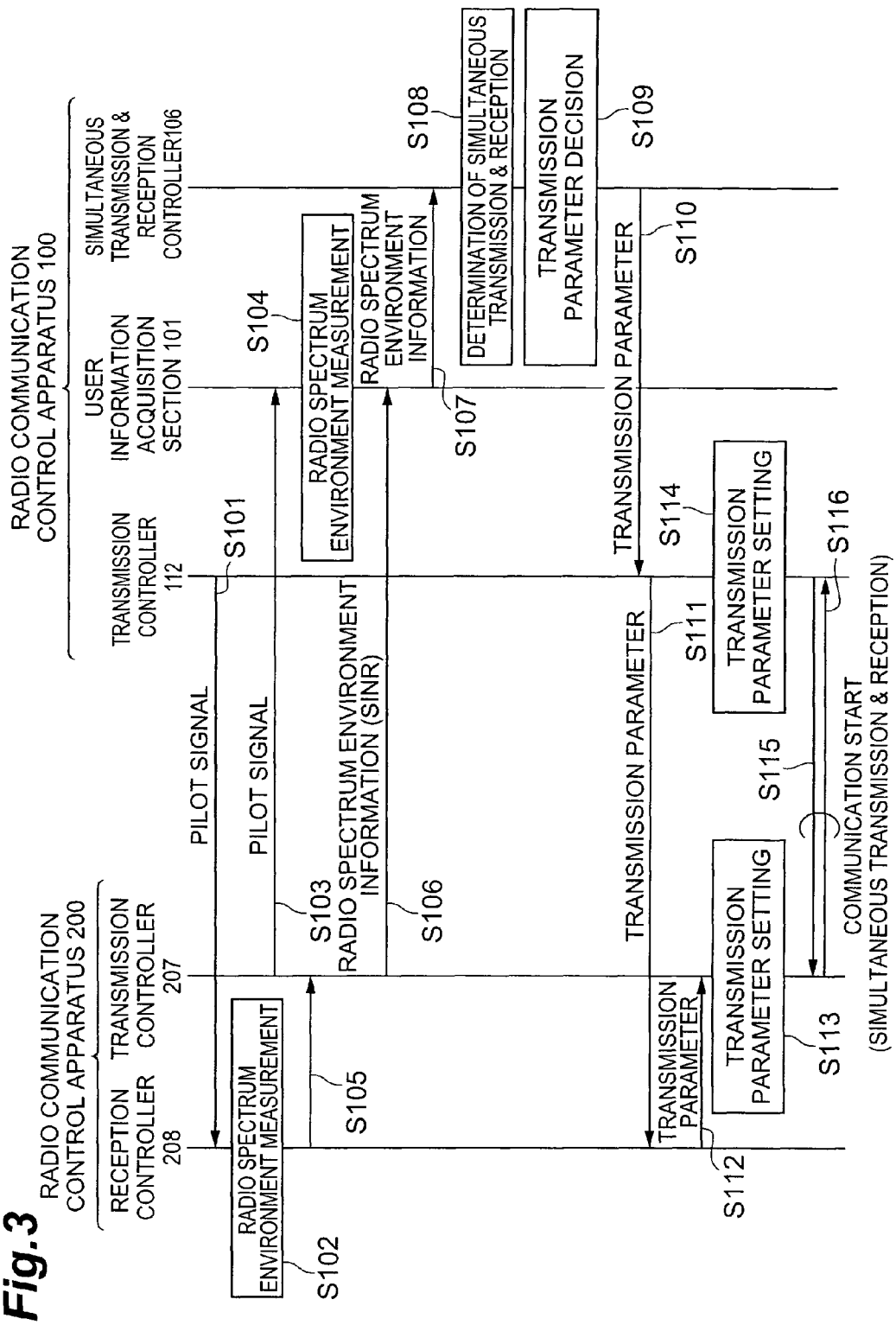
FIG. 3 is a sequence diagram illustrating the operation of the radio communication control apparatus 100 and the radio communication control apparatus 200.

The operation of the radio communication control apparatus 100 and the radio communication control apparatus 200 thus configured will be described. FIG. 3 is a sequence diagram illustrating the operation of the radio communication control apparatus 100 and the radio communication control apparatus 200.

First, prior to simultaneous transmission and reception using the same frequency, in the radio communication control apparatus 100, the control signal transmission section 109 transmits a pilot signal (S101). Then, based on the pilot signal received in the radio communication control apparatus 200, the radio spectrum environment measurement section 201 measures the radio spectrum environment, such as SINR, of a signal being transmitted from the radio communication control apparatus 100 and received in the radio communication control apparatus 200 (S102). In parallel to the above processing, in the radio communication control apparatus 100, the control signal reception section 102 of the user information acquisition section 101 receives a pilot signal transmitted from the radio communication control apparatus 200 (S103), and the radio spectrum environment measurement section 104 measures the radio spectrum environment, such as SINR, of a signal being transmitted from the radio communication control apparatus 200 and received in the radio communication control apparatus 100 (S104).

Next, the radio communication control apparatus 200 transmits the radio spectrum environment information measured in the radio spectrum environment measurement section 201, to the transmission controller 207 (control signal transmission section 203) (S105). The control signal transmission section 203 transmits the received radio spectrum environment information to the radio communication control apparatus 100 (S106). The user information acquisition section 101 (the control signal reception section 102) of the radio communication control apparatus 100 receives the radio spectrum environment information of a signal being transmitted from the radio communication control apparatus 100 and received in the radio communication control apparatus 200 (S106). The radio spectrum environment information received in the radio communication control apparatus 100 is input to the simultaneous transmission & reception controller 106 (the simultaneous transmission & reception determination section 107) (S107).

Further, the radio spectrum environment information, measured in the radio communication control apparatus 100 in regard to the signal being transmitted from the radio communication control apparatus 200 and received in the radio communication control apparatus 100, is also input to the simultaneous transmission & reception determination section 107 (not shown in the figure). In the simultaneous transmission & reception determination section 107, a determination is made to perform simultaneous transmission and reception when both the radio spectrum environment information being received in S107 and the input radio spectrum environment information in the radio communication control apparatus 100 are higher than a threshold, or not to perform the simultaneous transmission and reception when the radio spectrum environment information is lower than the threshold (S108). Then, with the determination of whether the simultaneous transmission and reception are to be performed, transmission parameters suitable for the simultaneous transmission and reception, including simultaneous transmission and reception information indicating whether to perform the simultaneous transmission and reception, are decided (S109). Here, the decision whether the radio spectrum environment information value is high or low can be made, for example, by setting a threshold according to a user-requested information transmission speed, and by determining whether the above radio spectrum environment information value exceeds the set threshold. Namely, in the simultaneous transmission & reception determination section 107, when it is determined that the radio spectrum environment information exceeds the threshold, the simultaneous transmission and reception are determined to be executable, on condition that the user-requested information transmission speed is satisfied.

Both simultaneous transmission and reception information determined by the simultaneous transmission & reception determination section 107, indicating the possibility/impossibility of simultaneous transmission and reception (here, the information indicating the simultaneous transmission and reception are possible) and the transmission parameters decided by the transmission parameter decision section 108 are input into the transmission controller 112 (the transmission parameter setting section 110), so that the transmission parameters are set (S114). Further, the control signal transmission section 109 transmits the above-mentioned simultaneous transmission and reception information and the transmission parameters to the radio communication control apparatus 200, as control signal, which are then received in the reception controller 208 (the control signal reception section 204) of the radio communication control apparatus 200 (S111).

In the radio communication control apparatus 200, when it is decided that the simultaneous transmission and reception are possible, the received simultaneous transmission and reception information indicating the possibility/impossibility of the simultaneous transmission and reception and the transmission parameters are transmitted to the transmission controller 207 (the transmission parameter setting section 205) (S112), and the transmission parameters are set by the transmission parameter setting section 205 (S113). When the simultaneous transmission and reception are determined to be possible, based on the set transmission parameters, data transmissions from both radio communication control apparatuses 100, 200 are performed in both the communication section 111 of the radio communication control apparatus 100 and the communication section 206 of the radio communication control apparatus 200, and thus, the simultaneous transmission and reception are started (S115, S116). Further, in S108, when it is determined that the simultaneous transmission and reception are not to be executed, transmission parameters to inhibit the simultaneous transmission and reception are set, and data is transmitted from one radio communication control apparatus. Thus, data transmission from the radio communication control apparatus 100 to the radio communication control apparatus 200 and data transmission from the radio communication control apparatus 200 to the radio communication control apparatus 100 are performed in different time segments.

By the operation as described above, in case of simultaneous transmission and reception, it is possible to decide whether to perform the simultaneous transmission and reception according to the radio spectrum environment of each radio communication control apparatus. Namely, by inhibiting the simultaneous transmission and reception when interference power is large, and performing the simultaneous transmission and reception in the environment having small interference, and thereby spectrum efficiency can be improved. Here, as radio spectrum environment information, SINR is used as criterion. However, it may also be possible to use received power as determination criterion, and by unit of control depending on the difference of either control signal such as ACK/NACK or data information, the data type, the priority, etc., it is possible to perform simultaneous transmission and reception according to the degree of importance of data.

Figure 4:
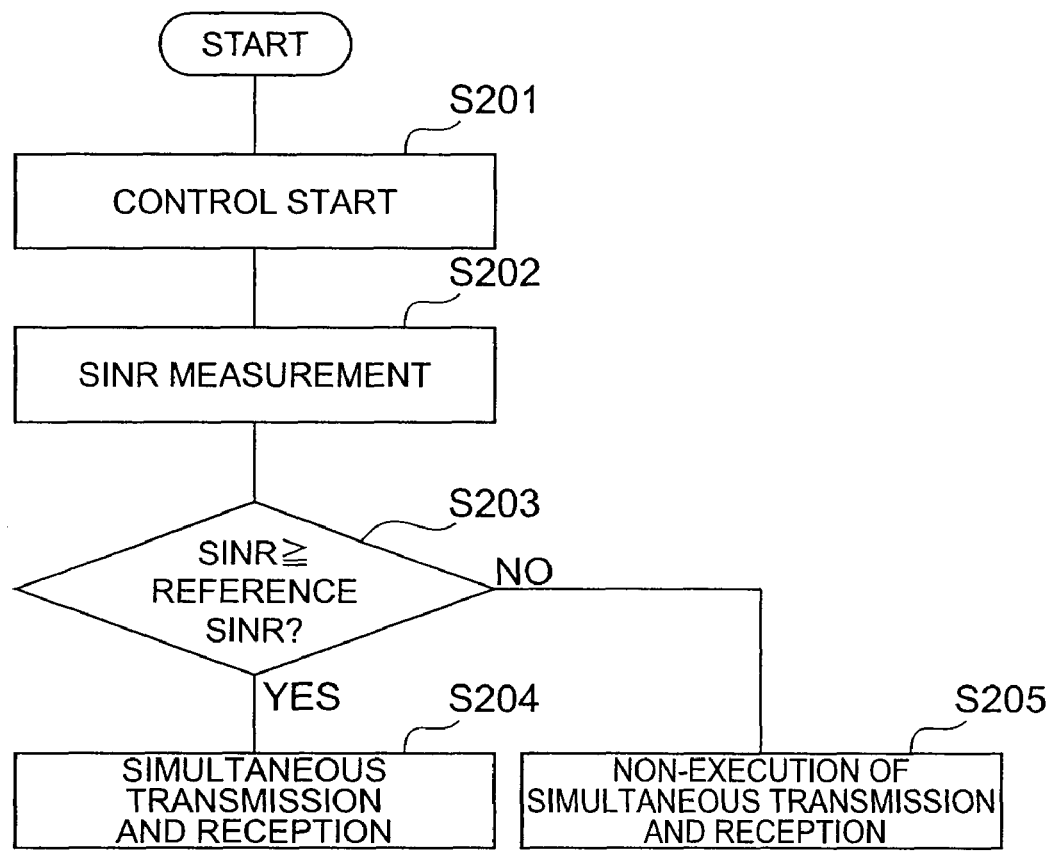
FIG. 4 is a sequence diagram illustrating the processing for determining whether or not simultaneous transmission and reception are to be performed.

Now, the detailed processing of S108 and S109 will be described further. FIG. 4 is a sequence diagram illustrating the processing in the radio communication control apparatus 100, to determine whether or not simultaneous transmission and reception are to be performed. First, in the radio communication control apparatus 100, a pilot signal is received by the radio spectrum environment measurement section 104, and control for determining whether nor not the simultaneous transmission and reception are possible is started (S201). Then, in the radio spectrum environment measurement section 104, based on the pilot signal, SINR is measured using the pilot signal transmitted from the radio communication control apparatus 200 (S202). Further, in the radio communication control apparatus 200, SINR is measured by use of the pilot signal transmitted from the radio communication control apparatus 100. The measured SINR is then notified from the radio communication control apparatus 200 to the radio communication control apparatus 100, as a control signal. Then, the SINR measured in the radio spectrum environment measurement section 104 is input into the simultaneous transmission & reception determination section 107, and it is determined whether the SINR measured in the radio spectrum environment measurement section 104 and the SINR being measured in the radio communication control apparatus 200 and received in the control signal reception section 102 are greater than a reference SINR, a threshold (S203).

Here, when both the SINR in the case of data transmission from the radio communication control apparatus 100 to the radio communication control apparatus 200 and the SINR in the case of data transmission from the radio communication control apparatus 200 to the radio communication control apparatus 100 are higher than a reference SINR, in the radio communication control apparatuses 100, 200 corresponding to the above SINRs, transmission parameter decision and setting processing is performed to enable simultaneous transmission and reception. Also, simultaneous transmission and reception information indicating that the simultaneous transmission and reception are possible is transmitted to the radio communication control apparatus 200 together with the transmission parameters, and set at the radio communication control apparatus 200 (S204, S109, S113 and S114). On the other hand, when the SINR is lower than the reference SINR, simultaneous transmission and reception information indicating that simultaneous transmission and reception are impossible is transmitted to the radio communication control apparatus 200, together with the transmission parameters. Then, in the radio communication control apparatuses 100, 200, transmission parameters are determined and set, so that data transmission from the radio communication control apparatus 100 and data transmission from the radio communication control apparatus 200 are performed in different time segments (S205, S109, S113 and S114). With the above control, a radio communication control apparatus having a high SINR can achieve high throughput by unit of simultaneous transmission and reception. In contrast, a radio communication control apparatus having a low SINR can reduce the deterioration of an error rate performance caused by simultaneous transmission and reception, because transmission processing is carried out in a different time segment (time slot) without simultaneous data transmission and reception. Accordingly, it becomes possible to attain performance optimization according to the SINR. Further, it is possible to expand to a method of performing simultaneous transmission and reception only in case of either one SINR exceeds the reference SINR value, by measuring SINR either on a link from the radio communication control apparatus 100 to the radio communication control apparatus 200, or on a link from the radio communication control apparatus 200 to the radio communication control apparatus 100.

Now, hereinafter, functions and effects of the radio communication control apparatus 100 according to the first embodiment will be described. The radio communication control apparatus 100 according to the present embodiment receives reception control signal (for example, at least one items among simultaneous transmission and reception information, radio spectrum environment information, traffic information, received power value, etc.) from the radio communication control apparatus 200, using the control signal reception section 102. Then, based on the received reception control signal, the radio communication control apparatus 100 can determine whether simultaneous transmission and reception with the above-mentioned radio communication control apparatus 200 using the same frequency are possible, using the simultaneous transmission & reception determination section 107.

For example, when the radio spectrum environment information has a predetermined value or higher, the simultaneous transmission and reception are determined to be possible, while when the radio spectrum environment information has a lower value than a predetermined value, the simultaneous transmission and reception are determined to be impossible. Also, based on the traffic information, it may be determined that the simultaneous transmission and reception are possible when the transmission signal is data and that the simultaneous transmission and reception are impossible when the transmission signal is a control signal. Further, among the traffic information, it may be determined that the simultaneous transmission and reception are impossible for the traffic information having a high priority, and that the simultaneous transmission and reception are possible for the traffic information having a low priority. Still further, it may be determined that the simultaneous transmission and reception are possible if the received power has a predetermined value or higher, and that the simultaneous transmission and reception are impossible if the received power is lower than the predetermined value.

Then, the control signal transmission section 109 transmits, to the radio communication control apparatus 200, simultaneous transmission and reception information indicating that the simultaneous transmission and reception are possible when the simultaneous transmission and reception with a communication terminal using the same frequency are determined to be possible. Also, the control signal transmission section 109 transmits to the radio communication control apparatus 200 simultaneous transmission and reception information indicating that the simultaneous transmission and reception are impossible when the simultaneous transmission and reception with a communication terminal using the same frequency are determined to be impossible.

Thereafter, in the simultaneous transmission & reception determination section 107, when the simultaneous transmission and reception using the same frequency are determined to be possible, the simultaneous transmission and reception with the above-mentioned communication terminal using the same frequency may be executed. Meanwhile, when the simultaneous transmission and reception using the same frequency are determined to be impossible, communication processing other than the simultaneous transmission and reception, for example, transmission/reception processing in different time slots, with the radio communication control apparatus 200 may be performed.

As a result, the simultaneous transmission and reception using the same frequency are not necessarily performed, and when interference power is large, it is possible to prevent drastic degradation of a throughput performance, which may cause degraded spectrum efficiency, resulting from the execution of the simultaneous transmission and reception.

Moreover, when the simultaneous transmission and reception using the same frequency are determined to be possible in the simultaneous transmission & reception determination section 107, the radio communication control apparatus 100 decides transmission parameters suitable for the simultaneous transmission and reception using the same frequency in the transmission parameter decision section 108. Also, when the simultaneous transmission and reception using the same frequency are determined to be impossible, transmission parameters suitable for performing communication processing other than the simultaneous transmission and reception using the same frequency can be decided in the transmission parameter decision section 108. Then, the determined transmission parameters are set by the transmission parameter setting section 110, and also the decided transmission parameters are transmitted to the radio communication control apparatus 200, together with the simultaneous transmission and reception information indicating whether or not the simultaneous transmission and reception are possible. After the above transmission, the communication section 111 can perform either the simultaneous transmission and reception using the same frequency, or communication processing other than the simultaneous transmission and reception using the same frequency.

As a result, it is possible to set transmission parameters suitable for either simultaneous transmission and reception using the same frequency or communication processing other than the simultaneous transmission and reception using the same frequency. For example, when performing the simultaneous transmission and reception using the same frequency, it is possible to set transmission parameters which enable interference suppression, and improve system throughput.

Second Embodiment

Figure 5:
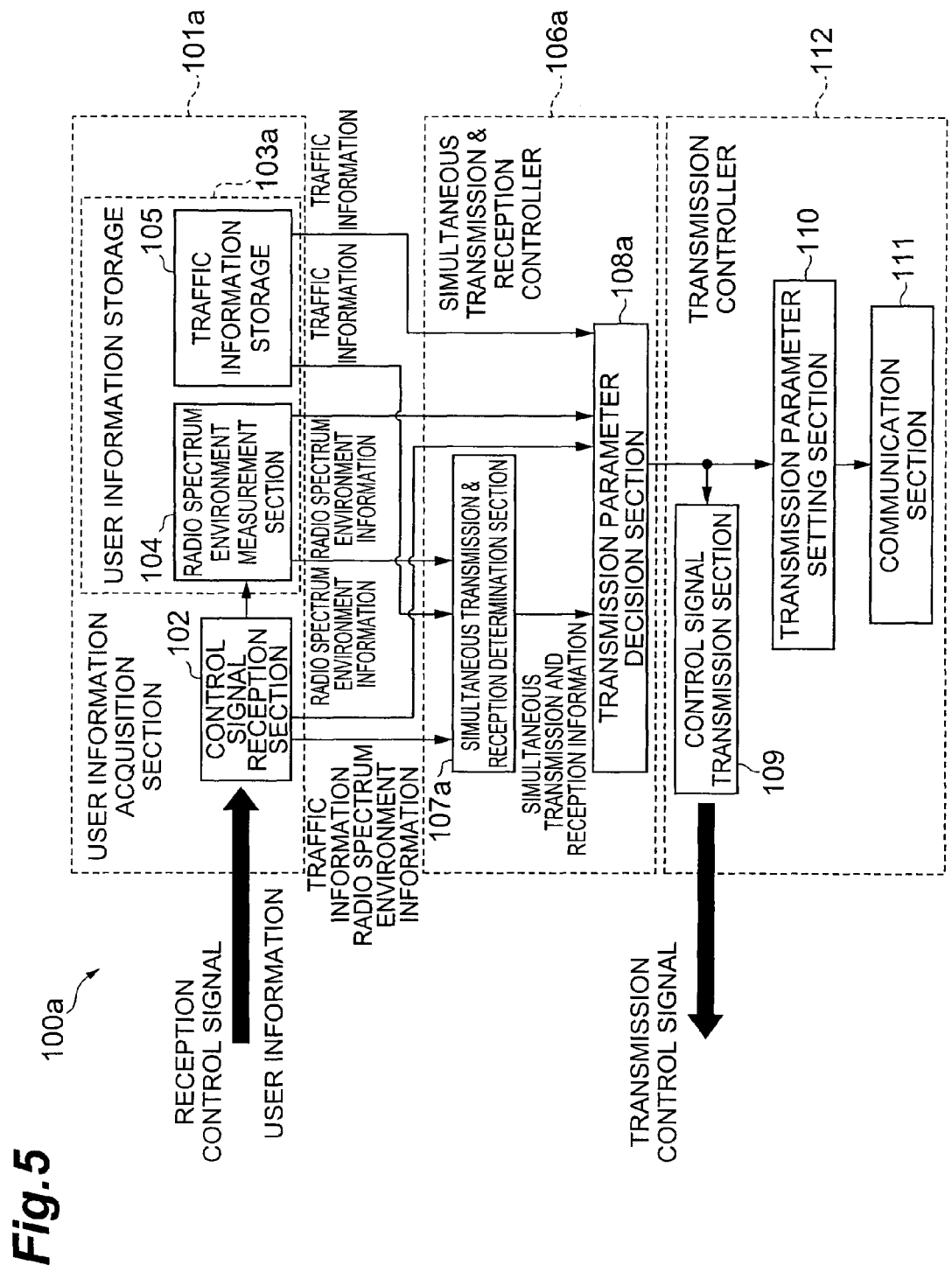
FIG. 5 is a block diagram of a radio communication control apparatus 100a according to the second embodiment.

Next, a radio communication control apparatus 100a according to a second embodiment will be described. FIG. 5 is a block diagram of the radio communication control apparatus 100a. The radio communication control apparatus 100a includes a user information acquisition section 101a, a simultaneous transmission & reception controller 106a and a transmission controller 112. Here, the user information acquisition section 101a has a control signal reception section 102 (control signal reception unit) and a user information storage 103a. The above user information storage 103a includes a radio spectrum environment measurement section 104 and a traffic information storage 105, and the simultaneous transmission & reception controller 106a includes a simultaneous transmission & reception determination section 107a (simultaneous transmission and reception determination unit) and a transmission parameter decision section 108a (parameter decision unit). Also, the transmission controller 112 includes a control signal transmission section 109 (control signal transmission unit), a transmission parameter setting section 110 (parameter setting unit), and a communication section 111 (communication unit).

The points of difference from the radio communication control apparatus 100 shown in FIG. 1 are: the traffic information storage 105 is added to the user information storage 103a; and the simultaneous transmission & reception controller 106a determines simultaneous transmission and reception based on the traffic information from the traffic information storage 105, and decides transmission parameters. The other configuration elements are the same as those in the radio communication control apparatus 100 shown in FIG. 1. Hereinafter, the points of difference will be described concretely.

The traffic information storage 105 is a portion which stores traffic information determined according to the data traffic to be transmitted from the radio communication control apparatus 100. Specifically, there are stored a data traffic type for transmission (either data transmission or the transmission of control signal), priority information decided according to the above data traffic type, required reception quality information decided according to the data traffic type for transmission, data amount information which is information of data amount of the data traffic for transmission, transmission power, etc. Here, the priority information is information indicative of the priority level of the transmission signal, and the priority level is decided based on whether control signal or not, and the type such as voice, video, data, etc.

The simultaneous transmission & reception determination section 107a is a portion which determines whether simultaneous transmission and reception are possible, based on radio spectrum environment information and traffic information. Specifically, both the radio spectrum environment information (such as SINR), which is measured in the radio spectrum environment measurement section 104, in regard to a signal being transmitted from second radio equipment, opposite party, and received in the radio communication control apparatus 100, and the radio spectrum environment information, which is received in the control signal reception section 102, in regard to a signal transmitted from the radio communication control apparatus 100 and received in the second radio equipment, are inputted to the simultaneous transmission & reception determination section 107a. The simultaneous transmission & reception determination section 107a then compares the above sets of radio spectrum environment information with a reference SINR i.e. a predetermined threshold, and determines that the simultaneous transmission and reception are possible, on deciding that the both sets of input radio spectrum environment information are not smaller than the reference SINR.

Also, when the simultaneous transmission & reception determination section 107a determines to be smaller than the reference SINR, the simultaneous transmission & reception determination section 107a further determines whether or not the simultaneous transmission and reception are possible, based on both the traffic information input from the traffic information storage 105 and the traffic information of the opposite party received in the control signal reception section 102. Here, the simultaneous transmission & reception determination section 107a determines whether each transmission signal to be transmitted from each of the radio communication control apparatuses 100, 200 is a data signal or a control signal such as ACK/NACK. When it is determined to be a data signal, it is determined that the simultaneous transmission and reception are possible, while when it is determined to be a control signal, it is determined that the simultaneous transmission and reception are impossible.

Further, when the transmission signal is a data signal, the simultaneous transmission & reception determination section 107a may determine that the simultaneous transmission and reception are possible, even if the radio spectrum environment information is lower than the threshold, because degradation of reception quality to some extent produces little problem upon communication execution. To the contrary, when the transmission signal is a control signal, there is a risk that communication execution may be disabled because of signal deterioration caused by the simultaneous transmission and reception. Therefore, preferably, it is determined that the simultaneous transmission and reception are impossible.

Additionally, the determination processing in the simultaneous transmission & reception determination section 107a is not limited to the determination method described above. For example, such a method as shown in the following may be applicable. First, the simultaneous transmission & reception determination section 107a determines that simultaneous transmission and reception are possible when the traffic information indicates a data signal. If the traffic information does not indicate a data signal, then, the simultaneous transmission & reception determination section 107a determines whether or not the radio spectrum environment information is greater than the threshold. When the radio spectrum environment information is determined to be not smaller than the threshold, it may be determined that the simultaneous transmission and reception are possible, whereas when the radio spectrum environment information is determined to be smaller than the threshold, it may be determined that the simultaneous transmission and reception are impossible.

The transmission parameter decision section 108a decides transmission parameters according to the radio spectrum environment information, which is received in the control signal reception section 102, in regard to a signal being transmitted from the radio communication control apparatus 100 and received in the opposite party, and the radio spectrum environment information, which is measured in the radio spectrum environment measurement section 104, in regard to a signal transmitted from the opposite party and received in the radio communication control apparatus 100, and the traffic information which is stored in the traffic information storage 105. The transmission parameter decision section 108a outputs the decided transmission parameters to the transmission controller 112, together with the simultaneous transmission and reception information, which is a determination result obtained in the simultaneous transmission & reception determination section 107a. Additionally, it is preferable that transmission parameters suitable for the radio spectrum environment of each radio communication control apparatus are set in each radio communication control apparatus, similarly to the first embodiment.

As such, the radio communication control apparatus 100a can determine whether simultaneous transmission and reception are possible, based on the radio spectrum environment information of both the opposite party and the self-apparatus, and the traffic information, and also can decide transmission parameters based on the above information.

Figure 6:
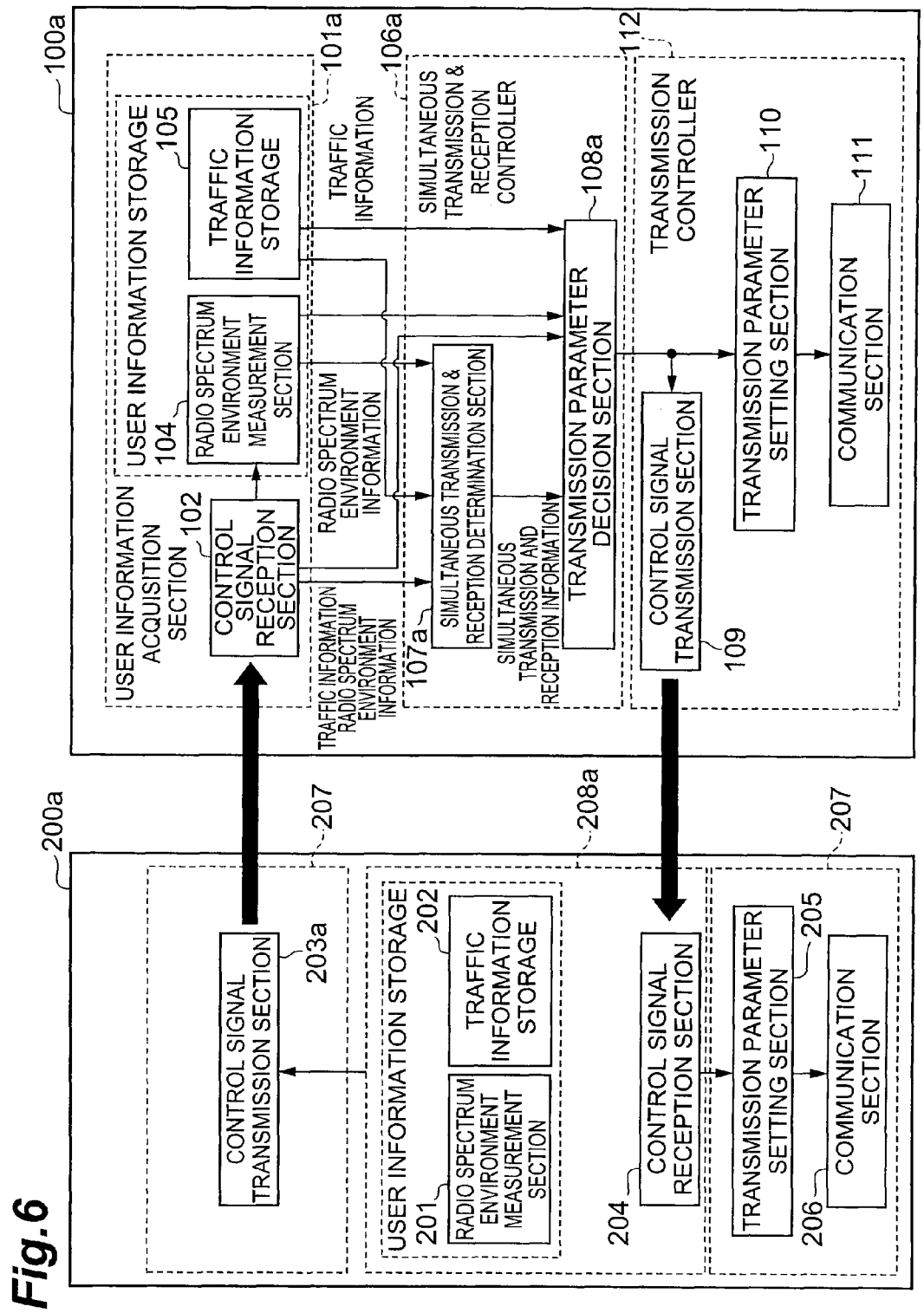
FIG. 6 is a block diagram of a radio communication control apparatus 200a according to a second embodiment.

Next, the configuration of a radio communication control apparatus 200a, which is an opposite party of the radio communication control apparatus 100a, will be described. FIG. 6 is a block diagram of the radio communication control apparatus 200a. The above radio communication control apparatus 200a includes a transmission controller 207 and a reception controller 208a. The transmission controller 207 includes a control signal transmission section 203a, a transmission parameter setting section 205 and a communication section 206. The reception controller 208a includes a user information storage, being constituted of a radio spectrum environment measurement section 201 and a traffic information storage 202, and a control signal reception section 204.

The point of difference from the radio communication control apparatus 200 shown in FIG. 2 are that the reception controller 208a further includes the traffic information storage 202, and the control signal transmission section 203a transmits, to the radio communication control apparatus 100a, both the radio spectrum environment information measured in the radio spectrum environment measurement section 201 and the traffic information stored in the traffic information storage 202. Other configurations are identical to the radio communication control apparatus 200, and therefore, the descriptions thereof are omitted, and only the different configuration elements will be described below.

The traffic information storage 202 is a portion which stores traffic information determined according to the data traffic transmitted from the radio communication control apparatus 200. Specifically, there are stored a data traffic type for transmission (either data transmission or the transmission of control signal), priority information decided according to the above data traffic type, required reception quality information decided according to the data traffic type for transmission, data amount information which is information of data amount of the data traffic for transmission, transmission power, etc. Here, the priority information is information indicative of the priority level of the transmission signal, and the priority level is determined based on whether or not the transmission signal is control signal, and the type such as voice, video and data.

The control signal transmission section 203a is a portion which transmits to the radio communication control apparatus 100a the radio spectrum environment information measured in the radio spectrum environment measurement section 201 and the traffic information stored in the traffic information storage 202.

Figure 7:
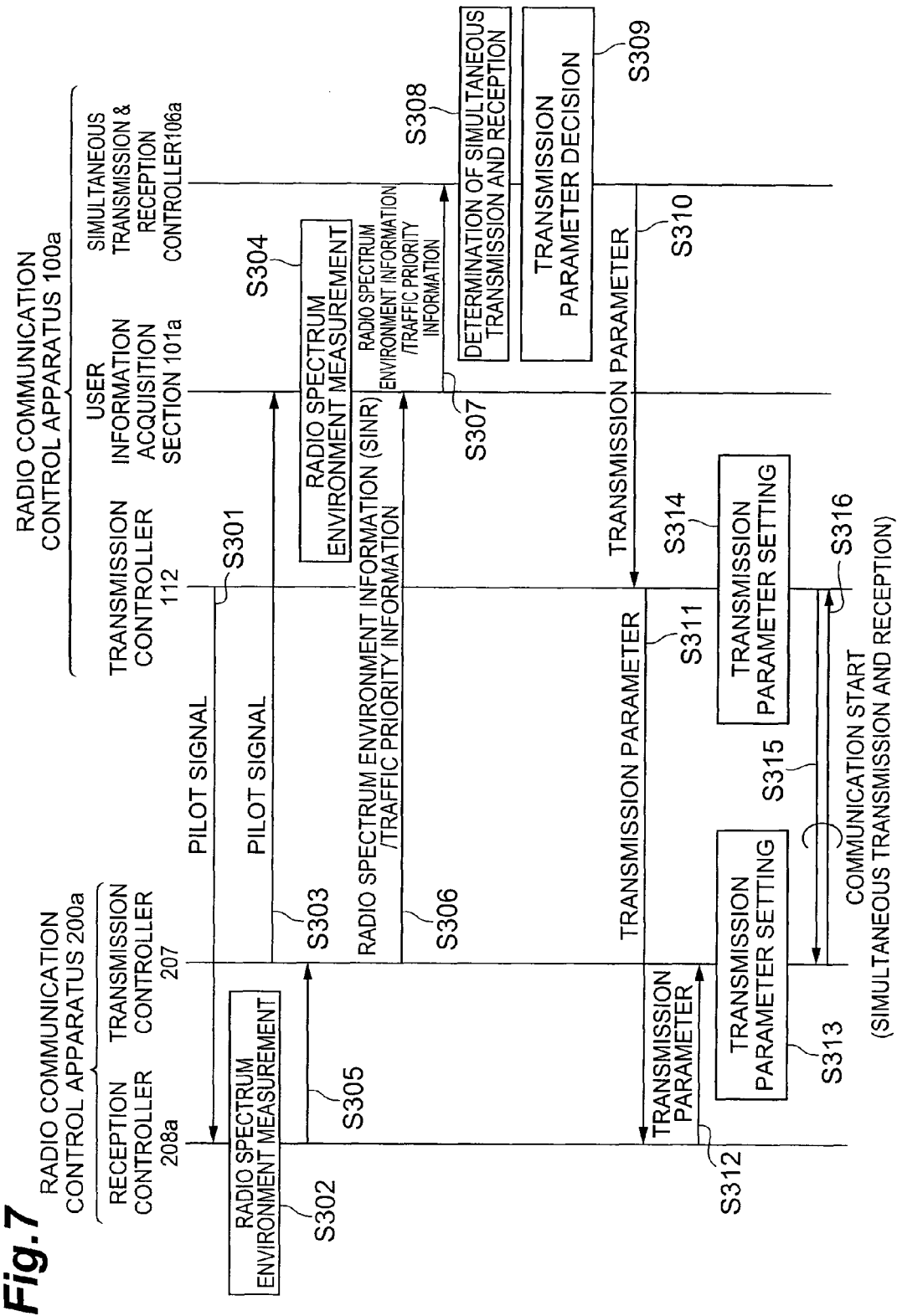

The operation of the radio communication control apparatuses 100a and 200a configured as shown above will be described. FIG. 7 is a sequence diagram illustrating the processing of the radio communication control apparatuses 100a and 200a.

The control signal reception section 204 in the reception controller 208a of the radio communication control apparatus 200a receives a pilot signal transmitted from the radio communication control apparatus 100a (S301), and using the above pilot signal, the radio spectrum environment measurement section 201 in the reception controller 208a measures the radio spectrum environment, such as SINR, of a signal being transmitted from the radio communication control apparatus 100a and received in the radio communication control apparatus 200a (S302). In parallel to the above processing, in the radio communication control apparatus 200a, the control signal transmission section 203a in the transmission controller 207 transmits a pilot signal to the radio communication control apparatus 100a (S303). In the radio communication control apparatus 100a, based on the above pilot signal, the radio spectrum environment measurement section 104 in the user information acquisition section 101a measures the radio spectrum environment of a signal being transmitted from the radio communication control apparatus 200a and received in the radio communication control apparatus 100a (S304).

Meanwhile, in the radio communication control apparatus 200a, the control signal transmission section 203a in the transmission controller 207 extracts a traffic type stored in the traffic information storage 202 (S305), and transmits to the radio communication control apparatus 100a as traffic priority information, together with the radio spectrum environment information being output from the radio spectrum environment measurement section 201 (S306).

The radio spectrum environment information and the traffic priority information received in the control signal reception section 102 of the radio communication control apparatus 100a are input into the simultaneous transmission & reception determination section 107a in the simultaneous transmission & reception controller 106a (S307). The radio spectrum environment information such as SINR, measured in the radio communication control apparatus 100a in regard to the signal being transmitted from the radio communication control apparatus 200a and received in the radio communication control apparatus 100a, and the traffic priority information in the radio communication control apparatus 100a are also input into the simultaneous transmission & reception determination section 107a in the simultaneous transmission & reception controller 106a. In the above simultaneous transmission & reception determination section 107a, when the SINR is not smaller than a predetermined threshold, and in case of the packet transmission of a data signal (not a control signal such as ACK/NACK), it is determined to perform simultaneous transmission and reception, while in other cases, it is determined not to perform simultaneous transmission and reception (S308), and the transmission parameter decision section 108a decides transmission parameters according to the respective cases (S309). The above processing is based on a decision criterion such that, in regard to the control signal such as ACK/NACK, simultaneous transmission and reception having a risk of degradation of received signal quality affected by interference are not performed, because the control signal such as ACK/NACK is required to be transmitted with high reliability.

Thereafter, the possibility/impossibility information of simultaneous transmission and reception determined in the simultaneous transmission & reception determination section 107a and the transmission parameters decided by the transmission parameter decision section 108a are output to the transmission parameter setting section 110 of the transmission controller 112 (S310), and set by the transmission parameter setting section 110 of the radio communication control apparatus 100a (S314). Also, the above-mentioned possibility/impossibility information of simultaneous transmission and reception and the transmission parameters are transmitted to the radio communication control apparatus 200a, by the control signal transmission section 109 in the radio communication control apparatus 100a(S311).

Then, after being received as control signal by the control signal reception section 204 in the radio communication control apparatus 200a, when the simultaneous transmission and reception are decided to be possible, the transmission parameters are output to the transmission parameter setting section 205 in the transmission controller 207 (S312), and set by the transmission parameter setting section 205, as transmission parameters for performing data transmission (S313). When it is determined that the simultaneous transmission and reception are possible, based on the set transmission parameters, the communication section 206 and the communication section 111 execute simultaneous transmission and reception (S315, S316). On the other hand, when the simultaneous transmission and reception are not to be performed, data is transmitted from one radio communication control apparatus. Namely, data transmission from the radio communication control apparatus 100 to the radio communication control apparatus 200 and data transmission from the radio communication control apparatus 200 to the radio communication control apparatus 100 are performed in different time segments.

With the above processing, when performing simultaneous transmission and reception, it is possible to decide the possibility/impossibility of the simultaneous transmission and reception based on the traffic priority information, in addition to the radio spectrum environment of each radio communication control apparatuses 100a, 200a. Here, as a criterion, both the SINR and the traffic priority information indicative of the discrimination of the control signal/data signal are used. However, it is possible to expand to a method controlling combination of determination criterion according to received power, data priority, etc.

Figure 8:
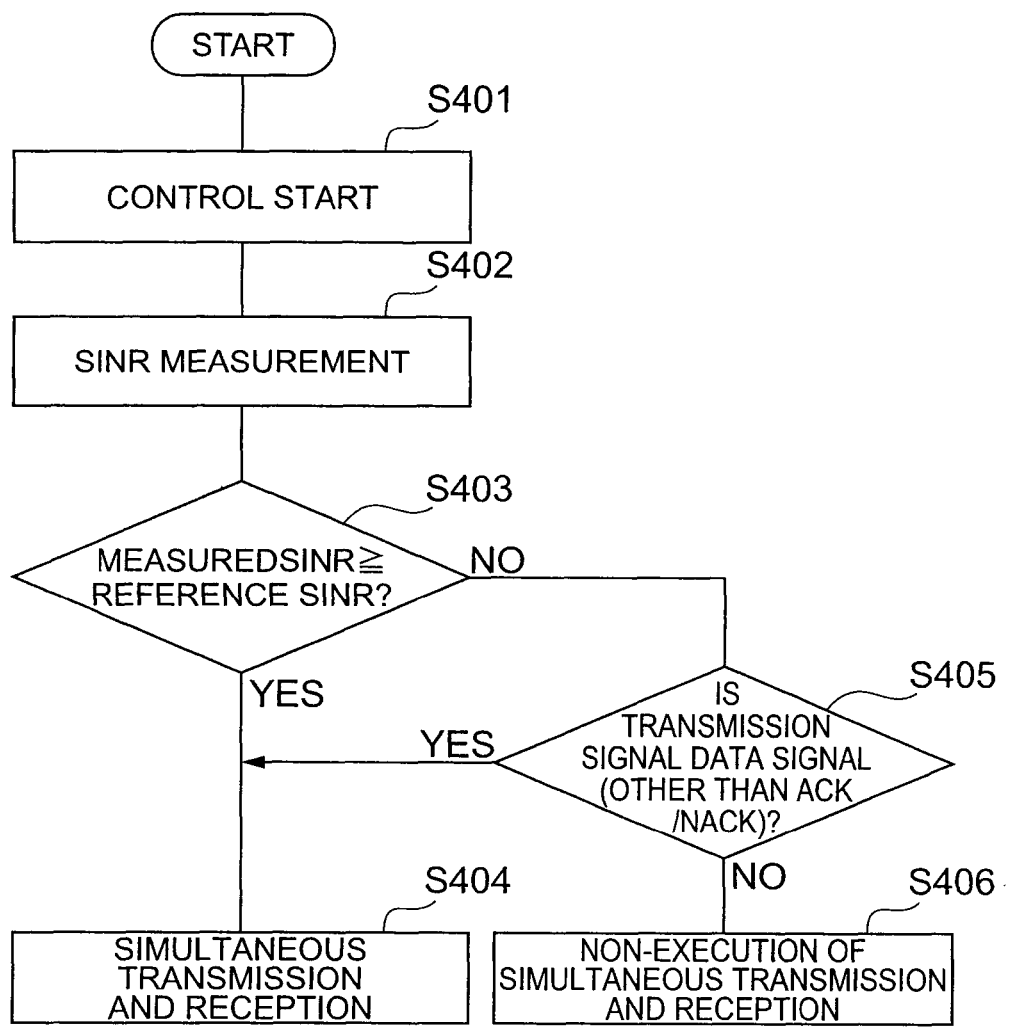
FIG. 8 is a flowchart illustrating detailed processing of the determination of simultaneous transmission and reception.

Now, the detailed processing of the determination of the simultaneous transmission and reception in S308 and S309 will be described. FIG. 8 is a flowchart illustrating detailed processing of the determination of simultaneous transmission and reception in S308 and S309. First, in the radio communication control apparatus 100a, a pilot signal is received by the radio spectrum environment measurement section 104, and control for the determination of simultaneous transmission and reception is started (S401). Then, in the radio spectrum environment measurement section 104, using the pilot signal transmitted from the radio communication control apparatus 200a, the radio spectrum environment (SINR) of a signal being transmitted from the radio communication control apparatus 200a and received in the radio communication control apparatus 100a is measured. Also, in the radio spectrum environment measurement section 201 of the radio communication control apparatus 200a, the radio spectrum environment (SINR) of a signal being transmitted from the radio communication control apparatus 100a and received in the radio communication control apparatus 200a is measured, and notified to the radio communication control apparatus 100a, as control signal. The notified radio spectrum environment information (SINR) is input into the radio spectrum environment measurement section 104 (S402).

Then, when the simultaneous transmission & reception determination section 107a determines that the radio spectrum environment in both the uplink and downlink has a greater value than, and inclusive of, a reference SINR, namely, when the simultaneous transmission & reception determination section 107a determines that both the radio spectrum environment information transmitted from the radio communication control apparatus 200a and the radio spectrum environment information measured in the radio communication control apparatus 100a are greater than, and inclusive of, the reference SINR, a threshold (S403), the transmission parameter decision section 108a generates information to the effect that simultaneous transmission and reception are to be performed, and decides transmission parameters suitable for simultaneous transmission and reception, and further, sets the transmission parameters so as to enable simultaneous transmission and reception with the radio communication control apparatus 200a (S404). On the other hand, on determining that the radio spectrum environment information is smaller than the reference SINR, the simultaneous transmission & reception determination section 107a determines whether or not the transmission signals from the radio communication control apparatuses 100a, 200a are data signals (i.e. signals other than ACK/NACK) (S405).

Here, on determining that both the transmission signals from the radio communication control apparatuses 100a, 200a are data signals, the simultaneous transmission & reception determination section 107a sets the transmission parameters so as to perform simultaneous transmission and reception (S404, S313, S314). When the simultaneous transmission & reception determination section 107a determines that both the transmission signals are not data signals, the transmission parameter decision section 108a sets the transmission parameters so that both the radio communication control apparatuses 100a, 200a execute data transmission, using different time segments.

With such the control, a user terminal having a high SINR can achieve high throughput by simultaneously executing transmission and reception, while a user having a low SINR can reduce the deterioration of an error rate performance caused by the simultaneous transmission and reception, and also can control not to execute simultaneous transmission and reception in regard to a control signal such as ACK/NACK, having a risk of degraded received signal quality affected by interference. Thus, transmission performance optimization according to SINR and traffic priority information can be attained. Further, the method may also be expandable to performing simultaneous transmission and reception when the SINR exceeds a reference SINR, by measuring received power either on a link from the radio communication control apparatus 100 to the radio communication control apparatus 200, or on a link from the radio communication control apparatus 200 to the radio communication control apparatus 100.

Here, the functions and effects of the radio communication control apparatus 100a according to the second embodiment will be described below. The radio communication control apparatus 100a according to the present embodiment determines in the simultaneous transmission & reception determination section 107a that simultaneous transmission and reception are possible when radio spectrum environment information is not smaller than a predetermined value. Further, when radio spectrum environment information is smaller than a predetermined value, the radio communication control apparatus 100a determines whether the transmission signal is a data signal or a control signal. Then, in the simultaneous transmission & reception determination section 107a, it can be determined that simultaneous transmission and reception are possible when the transmission signal is determined to be a data signal, and that simultaneous transmission and reception are impossible when the transmission signal is determined not to be a data signal. Thus, it is possible to decide the possibility/impossibility of simultaneous transmission and reception using the same frequency, according to the transmission signal content. Accordingly, it is possible to make an appropriate decision according to the transmission signal content, in addition to the radio spectrum environment information, and to prevent degradation of system throughput.

Third Embodiment

Next, a radio communication control apparatus according to a third embodiment will be described. The radio communication control apparatus according to the present embodiment includes a feature of determining whether to perform simultaneous transmission and reception using an evaluation function by expressing in a numerical value radio spectrum environment such as SINR, transmission signal type to perform simultaneous transmission and reception, and data priority information to perform simultaneous transmission and reception, which are used as decision criteria in the second embodiment.

In the present embodiment, there is provided a simultaneous transmission & reception determination section 107b having different processing content from the simultaneous transmission & reception determination section 107a of the radio communication control apparatus 100a in the second embodiment. Here, exemplary processing using the following three sets of information as decision criterion is shown: radio spectrum environment information (SINR) in the radio communication control apparatus; transmission signal type indicative of whether a transmission signal to perform simultaneous transmission and reception is ordinary data information or control signal; and priority information of the transmission signal.

In the present embodiment, a weighted evaluation function for use as determination criterion is defined as A. By letting a value of the SINR information representing the radio spectrum environment as x, information representing the transmission signal type as y, and priority information of the data to perform simultaneous transmission and reception as z, the evaluation function A shown by the following expression (1) is used.

$$\text{Evaluation function } A = \alpha x + \beta y + \gamma z \tag{1}$$

As to the weighting information $\alpha$, $\beta$ and $\gamma$, for x, y and z, respectively, for use in calculating the weighted evaluation function A, it is possible to set arbitrarily, according to user requirement and required system specifications.

Figure 9:
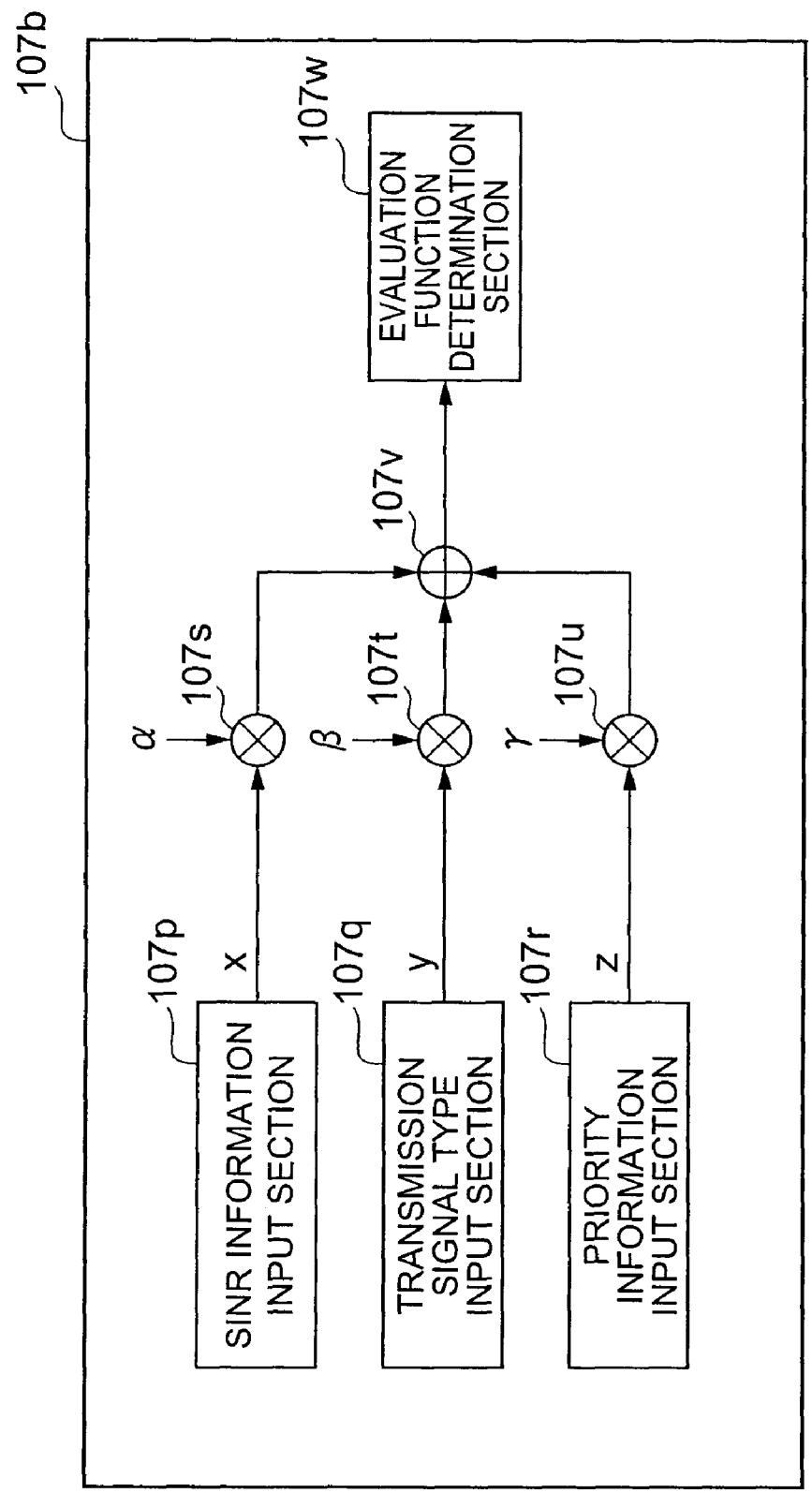
FIG. 9 is a detailed configuration diagram of a simultaneous transmission & reception determination section 107b according to a third embodiment.

When the above evaluation function A is greater than a predetermined threshold, simultaneous transmission and reception are determined to be possible, whereas when the evaluation function A is smaller than the predetermined threshold, simultaneous transmission and reception are determined to be impossible. Hereinafter, a typical structure of the above simultaneous transmission & reception determination section 107b is shown in FIG. 9. FIG. 9 is a detailed configuration diagram of the simultaneous transmission and reception determination section 107b.

The simultaneous transmission & reception determination section 107b includes an SINR information input section 107p, a transmission signal type input section 107q, a priority information input section 107r, multipliers 107s to 107u, an adder 107v, and an evaluation function determination section 107w. With the above configuration, the aforementioned evaluation function A is calculated, so as to determine simultaneous transmission and reception. In the following, each configuration element is described.

The SINR information input section 107p receives the radio spectrum environment information (SINR) being input from the radio spectrum environment measurement section 104, and outputs the received radio spectrum environment information to the multiplier 107s.

The transmission signal type input section 107q receives traffic information extracted from the traffic information storage 105, decides a transmission type based on the traffic information, and outputs the transmission type information to the multiplier 107t.

The priority information input section 107r receives traffic information extracted from the traffic information storage 105, decides the priority based on the traffic information, and outputs the priority information to the multiplier 107u.

The above output SINR information is defined as x, the transmission signal type as y, and the priority information as z, which are input to the multipliers 107s to 107u, so as to be multiplied by the coefficients $\alpha$ to $\gamma$. Each multiplied numerical value is added in the adder 107v, and thus, the value of the evaluation function A is calculated. The evaluation function determination section 107w compares the calculated value of the evaluation function A with a preset threshold, so as to determine whether the simultaneous transmission and reception are to be performed. Here, when the value of the evaluation function A is determined to be not smaller than the threshold, it is determined that the simultaneous transmission and reception are possible. To the contrary, when the value of the evaluation function A is determined to be smaller than the threshold, it is determined that the simultaneous transmission and reception are impossible.

Here, as a method for expressing the above variables x, y, z, in a numerical value in regard to the SINR information x, representing the radio spectrum environment, when the SINR measured to perform the determination of simultaneous transmission and reception is greater than the SINR value predetermined as reference value, the variable x representing the SINR information is set to one, whereas when the measured value is smaller than the reference value, the variable x representing the SINR information is set to zero. Alternatively, it is also possible to define the value x to be a difference between the reference SINR value and the measured SINR value. As a result, when an SINR necessary for realizing the simultaneous transmission and reception is secured, the weighted evaluation function A becomes large, so as to function to perform simultaneous transmission and reception. Thus, it becomes possible to determine simultaneous transmission and reception according to the radio spectrum environment.

Also, in regard to the variable y, representing transmission signal type, as an example, when a transmission signal to perform simultaneous transmission and reception is a control signal, the variable y is set to zero, whereas when a signal is ordinary data information, y is set to one. As a result, since y=0 when transmitting a control signal, the weighted evaluation function A becomes small, resulting in functioning not to perform simultaneous transmission and reception. In other words, it becomes possible to control not to perform simultaneous transmission and reception as to the control signal requiring highly reliable transmission, while to perform simultaneous transmission and reception as to the data information not requiring highly reliable transmission. Thus, according to such the transmission signal type, it is possible to determine the possibility/impossibility of the simultaneous transmission and reception.

Further, in regard to the variable z, representing data priority information, any one of values of, for example, 1, 2, 3 or 4 is set, according to the data information content. For example, as to a data requiring high real-time nature such as voice data and streaming data, that is, a data of which low reliability is tolerable but requiring high real-time nature, the simultaneous transmission and reception are performed by assigning a large value to z. In contrast, as to a data not requiring high real-time nature but requiring high reliability, such as a large volume file data, it is controlled not to perform simultaneous transmission and reception by assigning a small value to z. As a result, it becomes possible to perform the determination of simultaneous transmission and reception, according to data priority information.

As such, in the present method of performing determination of simultaneous transmission and reception, using a weighted evaluation function A decided by SINR information, transmission signal type and priority information, as to the weighting variables $\alpha$, $\beta$ and $\gamma$, arbitrary values may be set, depending on user requirement and required system specifications. For example, when dealing with the SINR information, transmission signal type and priority information equivalently, $\alpha=\beta=\gamma$ may be acceptable. Alternatively, when the opposite party to perform simultaneous transmission and reception is a receiver apparatus having sufficiently high interference cancelling capability, by letting $\alpha$ to be a small value, thereby decreasing the weight of x resulting from the comparison between the measured SINR and the reference SINR, it becomes possible to determine simultaneous transmission and reception, laying emphasis on the transmission signal type and the priority information.

Further, such the values of $\alpha$, $\beta$ and $\gamma$ may be given in a fixed manner by the required system specification, etc. Or, the values of $\alpha$, $\beta$ and $\gamma$ may be controlled in an adaptive manner, as in the above-mentioned control according to the function of the receiver apparatus. Also, to adaptively control the values of $\alpha$, $\beta$ and $\gamma$, it may be possible to control the values of $\alpha$, $\beta$ and $\gamma$ based on predetermined information, as in the above-mentioned control according to the function of the receiver apparatus, or it may also be possible to control the values of $\alpha$, $\beta$ and $\gamma$, by feeding back temporally changing information, such as an actual throughput obtained when communication is performed before determining simultaneous transmission and reception.

Also, in relation to the scheduling technique in packet communication for deciding data transmission sequence to multiple users, for example, in case that data to be transmitted only to a certain user (radio communication control apparatus) exists, while no data to be transmitted to other users than the above user exists, a radio channel can be exclusively used for the communication with the user concerned. Therefore, in such the case, it becomes unnecessary to perform simultaneous transmission and reception with low reliability, aiming to increase transmission opportunity of the other users. As such, in a situation that a margin exists in terms of channel capacity, data transmission to the same user in continuous packets is possible. Accordingly, instead of determining simultaneous transmission and reception according to a transmission signal type and priority information, with an increased weighting coefficient $\alpha$ of SINR information, it becomes possible to perform simultaneous transmission and reception, when radio spectrum environment enabling simultaneous transmission and reception with sufficient signal quality is obtainable. Thus, it becomes possible to prevent degradation of the receiving signal quality.

Now, the functions and effects of the radio communication control apparatus according to the third embodiment will be described below. In the radio communication control apparatus according to the present embodiment, the SINR information i.e. radio spectrum environment information, the transmission signal type and the data transmission priority information are input into the SINR information input section 107$p$, the transmission signal type input section 107$q$ and the priority information input section 107$r$, respectively. Then, the multipliers 107$s$ to 107$u$ multiply the above input numerical values by the coefficients $\alpha$ to $\gamma$, respectively, and the adder 107$v$ calculates the sum thereof, so as to obtain an evaluation value. Thus, based on the evaluation value calculated and fed into the evaluation function determination section 107$w$, it is possible to determine whether or not simultaneous transmission and reception are possible. As a result, it is possible to appropriately decide whether or not simultaneous transmission and reception are possible, by comprehensively deciding the radio spectrum environment information, transmission signal type, priority, etc.

Fourth Embodiment

Next, a radio communication control apparatus 100$b$ according to a fourth embodiment will be described. The radio communication control apparatus 100$b$ includes a feature of setting transmission parameters having excellent interference tolerance, as transmission parameters for performing simultaneous transmission and reception, considering the interference produced when performing the simultaneous transmission and reception. For example, by applying error correction coding or spread spectrum when performing simultaneous transmission and reception, the influence of interference produced by performing simultaneous transmission and reception can be reduced. Namely, according to radio spectrum environment, information transmission speed requested by a user, transmission data type, etc., simultaneous transmission and reception can be performed efficiently by adaptively controlling the transmission parameters including the transmission power of the radio communication control apparatus 100$b$, the transmission power of the opposite party when data transmission is performed from the opposite party to the radio communication control apparatus 100$b$, the coding rate of error correction coding, the spreading factor, the modulation scheme, and so on.

Figure 10:
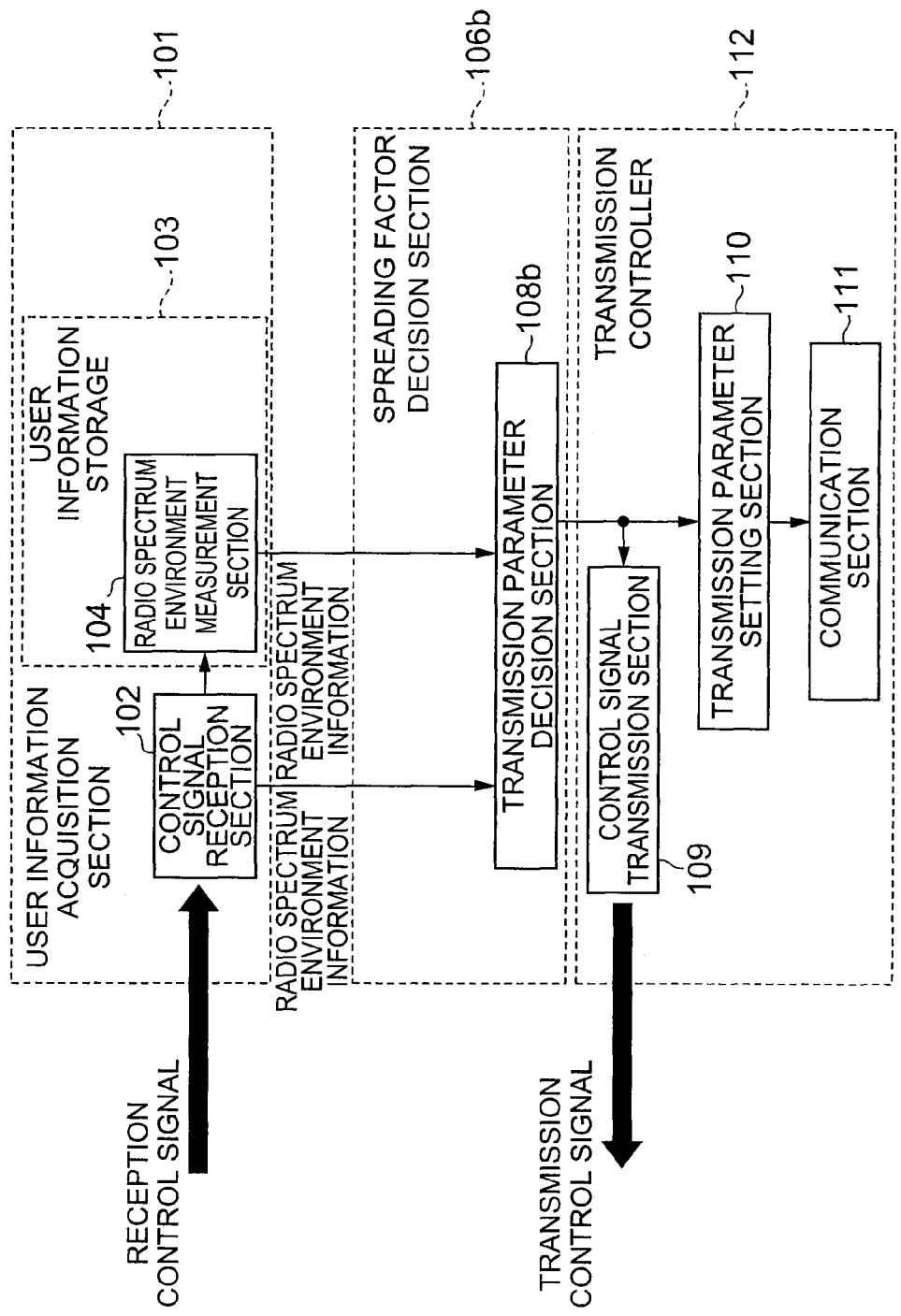
FIG. 10 is a block diagram of a radio communication control apparatus 100b according to a fourth embodiment.

FIG. 10 is a block diagram of a radio communication control apparatus 100$b$ according to the fourth embodiment. The radio communication control apparatus 100$b$ includes a user information acquisition section 101, a spreading factor decision section 106$b$ and a transmission controller 112. The user information acquisition section 101 (acquisition unit) includes a control signal reception section 102 and a user information storage 103. Also, the spreading factor decision section 106$b$ includes a transmission parameter decision section 108$b$ (parameter decision unit). Further, the transmission controller 112 includes a control signal transmission section 109 (control signal transmission unit), a transmission parameter setting section 110 (parameter setting unit), and a communication section 111 (communication unit).

The point of difference from the radio communication control apparatus 100 according to the first embodiment is that the spreading factor decision section 106$b$ is provided, in place of the simultaneous transmission & reception determination section 106.

The transmission parameter decision section 108$b$ in the spreading factor decision section 106$b$ receives radio spectrum environment information received in the control signal reception section 102 and radio spectrum environment information measured in the radio spectrum environment measurement section 104. According to each of the above radio spectrum environment information sets, the transmission parameter decision section 108$b$ decides a spreading factor in the radio communication of a spread spectrum method such as CDMA in the transmission parameters, as an example, and also decides transmission power of the transmission data. Specifically, when each set of the input radio spectrum environment information has a smaller value than a predetermined threshold, the spreading factor decision section 106$b$ controls to increase the spreading factor in the transmission signal. For example, as the spreading factor, a numerical value obtained by adding a predetermined value to a predetermined spreading factor (spreading factor in the processing of transmission and reception using different time segments) is decided. Also, when the input radio spectrum environment information is not smaller than the threshold, the spreading factor decision section 106$b$ controls to leave intact the spreading factor in the transmission data, or to decrease the spreading factor. For example, as the spreading factor, a numerical value obtained by subtracting a predetermined value from the predetermined spreading factor (spreading factor in the processing of transmission and reception using different time segments) is decided.

According to the present embodiment, the radio spectrum environment information measured in the radio spectrum environment measurement section 104 indicates the radio spectrum environment of a signal transmitted from the opposite party and received in the radio communication control apparatus 100$b$. Therefore, it is necessary to transmit the spreading factor adapted to the above radio spectrum environment to the opposite party so that the opposite party can set as a transmission parameter. To the contrary, in the radio communication control apparatus 100, it is necessary for the transmission parameter setting section 110 to set the spreading factor corresponding to the radio spectrum environment information, received in the control signal reception section 102, in regard to a signal being transmitted from the radio communication control apparatus 100$b$ and received in the opposite party. Here, it may be possible to control to increase the spreading factor in the transmission signals to be transmitted from both the radio communication control apparatuses, when either one of the radio spectrum environment information is smaller than a predetermined threshold, and to control to decrease the spreading factor in the transmission signals to be transmitted from both the radio communication control apparatuses, when either one of the radio spectrum environment information is greater than, and inclusive of, the threshold.

Further, when the radio spectrum environment information has a predetermined threshold or greater, the transmission parameter decision section 108$b$ in the spreading factor decision section 106$b$ controls to reduce the transmission power, and for example, decides the transmission power to a smaller value than a specified value. Meanwhile, when the radio spectrum environment information is smaller than the threshold, the transmission parameter decision section 108$b$ controls to increase the transmission power, and for example, decides the transmission power to a greater value than the specified value.

Similar to the control to the above-mentioned spreading factor, according to the present embodiment, the radio spectrum environment information measured in the radio spectrum environment measurement section 104 indicates the radio spectrum environment information of a signal transmitted from the opposite party and received in the radio communication control apparatus 100b. Therefore, it is necessary to transmit the transmission power adapted to the above radio spectrum environment information, to the opposite party so that the opposite party can set as a transmission parameter. To the contrary, in the radio communication control apparatus 100, it is necessary for the transmission parameter setting section 110 to set the transmission power corresponding to the radio spectrum environment information, received in the control signal reception section 102, in regard to a signal being transmitted from the radio communication control apparatus 100b and received in the opposite party. Here, it may be possible to control to increase the transmission power of the transmission signals to be transmitted from both the radio communication control apparatuses, when either one of the radio spectrum environment information is smaller than the predetermined threshold.

Additionally, it may also be possible that the transmission parameter decision section 108b decides not only the transmission power and the spreading factor, but other transmission parameters, such as coding rate of the error correction coding, modulation scheme, etc.

As such, the radio communication control apparatus 100b can decide the spreading factor and the transmission power in the transmission parameters, according to the radio spectrum environment information.

Figure 11:
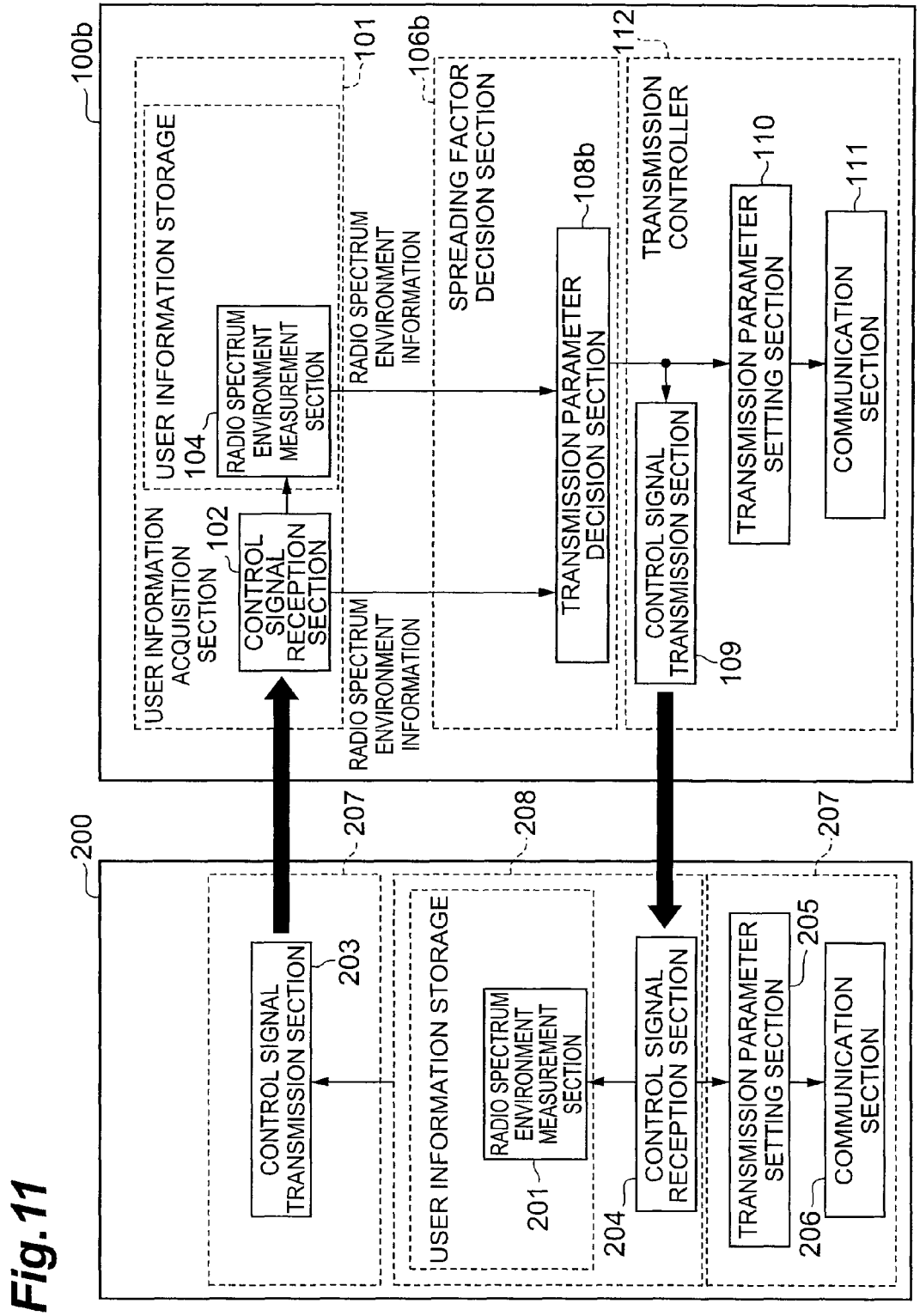
FIG. 11 is a block diagram of a radio communication control apparatus 200, which is a communication opposite party of a radio communication control apparatus 100b, according to the fourth embodiment.

Next, the configuration of a radio communication control apparatus 200, which is the opposite party of the radio communication control apparatus 100b, will be described. FIG. 11 is a block diagram of the radio communication control apparatus 200, the opposite party of the radio communication control apparatus 100b. The above radio communication control apparatus 200 has the same configuration as that of the radio communication control apparatus 200 in the first embodiment. The radio communication control apparatus 200 may be configured to measure a radio spectrum environment based on a pilot signal received from the radio communication control apparatus 100b, so as to transmit it to the radio communication control apparatus 100b.

Figure 12:
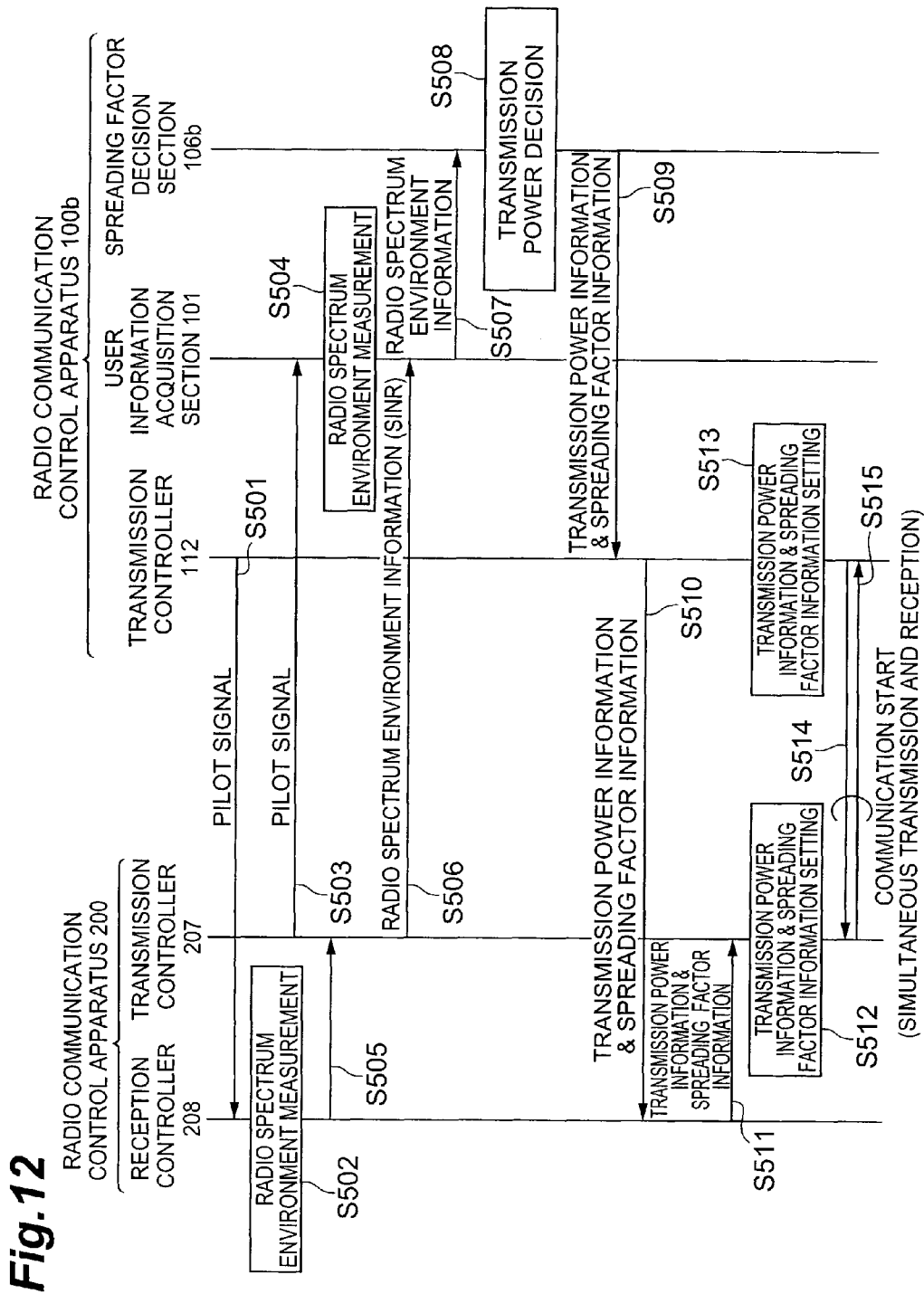
FIG. 12 is a sequence diagram illustrating the operation of the radio communication control apparatus 100b and the radio communication control apparatus 200.

The operation of the radio communication control apparatus 100b and the radio communication control apparatus 200 according to such to the present embodiment will be described. FIG. 12 is a sequence diagram illustrating the operation of the radio communication control apparatus 100b and the radio communication control apparatus 200. In the following, there will be described an example of performing transmission power control and setting an appropriate spreading factor, based on SINR, the radio spectrum environment information.

Hereinafter, typical control according to the present embodiment will be described, referring to FIG. 12. The control signal reception section 204 in the radio communication control apparatus 200 receives a pilot signal, etc. transmitted from the radio communication control apparatus 100b (S501). Then, the radio spectrum environment measurement section 201 in the reception controller 208 measures the radio spectrum environment information, such as SINR (S502), and outputs the measured radio spectrum environment information to the transmission controller 207 (S505), and further, the control signal transmission section 203 in the transmission controller 207 transmits the radio spectrum environment information to the radio communication control apparatus 100b (S506). Here, it may be possible to use control signal for transmission power control to indicate increase/decrease of transmission power, in addition to the radio spectrum environment information.

In parallel to the above processing, the control signal reception section 102 in the user information acquisition section 101 of the radio communication control apparatus 100b receives the pilot signal transmitted from the radio communication control apparatus 200 (S503), and measures the radio spectrum environment based on the pilot signal received in the radio spectrum environment measurement section 104 (S504).

As described above, the radio spectrum environment information, received in the radio communication control apparatus 100b, in regard to the signal being transmitted from the radio communication control apparatus 100b and received in the radio communication control apparatus 200 is received by the control signal reception section 102 in the user information acquisition section 101 of the radio communication control apparatus 100b (S506), and the received radio spectrum environment information is input into the transmission parameter decision section 108b (S507). Further, the radio spectrum environment information such as SINR, measured in the radio communication control apparatus 100b, in regard to the signal being transmitted from the radio communication control apparatus 200 and received in the radio communication control apparatus 100b is also input into the transmission parameter decision section 108b. In the transmission parameter decision section 108b, the spreading factor and the transmission power are decided based on the radio spectrum environment information (S508). In addition to the above information, it may be possible to decide the transmission parameters such as a coding rate of error correction coding and a modulation scheme.

Namely, when the transmission parameter decision section 108b determines that the radio spectrum environment information is smaller than the reference SINR, the transmission parameter decision section 108 decides the transmission parameter so as to increase the transmission power. Here, it may be possible to use an instruction command to increase the transmission power, as transmission power information in the radio communication control apparatus 100b. On determining that the radio spectrum environment information is not smaller than the reference SINR, the transmission parameter decision section 108b decides the transmission parameter so as to decrease the transmission power. Here, it may be possible to use an instruction command to decrease the transmission power, as transmission power information in the radio communication control apparatus 100b.

When the instruction command to increase the transmission power of the radio communication control apparatus 100b is included in the radio spectrum environment information transmitted from the radio communication control apparatus 200, the transmission parameter is decided so as to increase the transmission power in the radio communication control apparatus 100b, whereas when the instruction command to decrease the transmission power is included, the transmission parameter is decided so as to decrease the transmission power in the radio communication control apparatus 100b.

Here, since the transmission power in the radio communication control apparatus 100b is increased, the influence of coupling loop interference, produced by the simultaneous transmission and reception and received in the radio communication control apparatus 100b, becomes large. As a result, the SINR of the transmission signal transmitted from the radio communication control apparatus 200 to the radio communication control apparatus 100b at the time of simultaneous transmission and reception is decreased. Therefore, the transmission parameter decision section 108b decides to increase the spreading factor in the transmission parameters of the radio communication control apparatus 200 (S508). Incidentally, in contrast, the above control produces an increase of SINR when the transmission power is reduced, and therefore, it is possible to control to set the transmission parameter so as to decrease the spreading factor. With this, the reduction of information transmission speed can be suppressed.

The transmission parameter decision section 108b outputs the spreading factor information and the transmission power information thus decided, to the transmission parameter setting section 110 and the control signal transmission section 109 (S509). The control signal transmission section 109 transmits the transmission power information and the spreading factor information, to the radio communication control apparatus 200 (S510). Also, the transmission parameter setting section 110 sets the spreading factor and the transmission power, based on the input spreading factor information and the transmission power information (S513).

In the control signal reception section 204 of the radio communication control apparatus 200, the spreading factor information transmitted from the radio communication control apparatus 100b is received (S510), and from the above control signal reception section 204, the spreading factor information is notified to the transmission parameter setting section 205 (S511). In the transmission parameter setting section 205, the spreading factor and the transmission power are set (S512), and the simultaneous transmission and reception based on the set spreading factor are performed by the communication section 206 and the communication section 111 (S514, S515).

Here, in the above description, an example of transmission power control with SINR used as a criterion has been shown, as the control in the radio communication control apparatus 100b. However, it is possible to readily expand to transmission power control using a criterion different from SINR, such as reception power. Moreover, in the above-mentioned example, a method of adaptively controlling the spreading factor of spread spectrum has been shown, as the control in the radio communication control apparatus 200. However, it is possible to improve an error rate performance by controlling in other manners, such as adaptively controlling the coding rate in the error correction coding and the modulation scheme in the adaptive modulation/demodulation.

With such the configuration, transmission power control when performing simultaneous transmission and reception, and an interference mitigation using spreading factor control according thereto become possible. Namely, in the conventional transmission power control without considering simultaneous transmission and reception, the control is performed on the transmission side so that the reception quality such as SINR in the radio communication control apparatus, i.e. the receiving terminal, becomes a desired value. However, when the simultaneous transmission and reception are performed, the reception quality becomes deteriorated, because of coupling loop interference by a transmission signal. Accordingly, using the method of measuring SINR in both radio communication control apparatuses performing communication, and increasing the spreading factor or the transmission power when desired SINR values can be satisfied in both the radio communication control apparatuses, it becomes possible to improve the reception quality, and reduce the interference power.

Now, hereinafter, the functions and effects of the radio communication control apparatus 100b according to the fourth embodiment will be described. In the above radio communication control apparatus 100b, the control signal reception section 102 acquires the radio spectrum environment information of a signal being transmitted from the radio communication control apparatus 100b and received in the radio communication control apparatus 200, and the radio spectrum environment measurement section 104 acquires the radio spectrum environment information of a signal being transmitted from the radio communication control apparatus 200 and received in the radio communication control apparatus 100b. Then, based on the acquired radio spectrum environment information, the transmission parameter decision section 108b can decide the spreading factor in the transmission signal among the transmission parameters. Thereafter, the control signal transmission section 109 transmits the decided transmission parameter to the radio communication control apparatus 200, and the transmission parameter setting section 110 sets the decided transmission parameter. Using the set transmission parameter, the communication section 111 can perform simultaneous transmission and reception using the same frequency with the above-mentioned communication terminal. As a result, it is possible to set the transmission parameters according to the radio spectrum environment, prevent coupling loop interference at the time of simultaneous transmission and reception using the same frequency, and prevent degradation of the received signal quality.

Also, the transmission parameter decision section 108b in the radio communication control apparatus 100b can decide the transmission power of the transmission signal according to the radio spectrum environment information, so as to decide as the transmission parameter, and reduce coupling loop interference at the time of simultaneous transmission and reception using the same frequency, and prevent degradation of the received signal quality.

Fifth Embodiment

Figure 13:
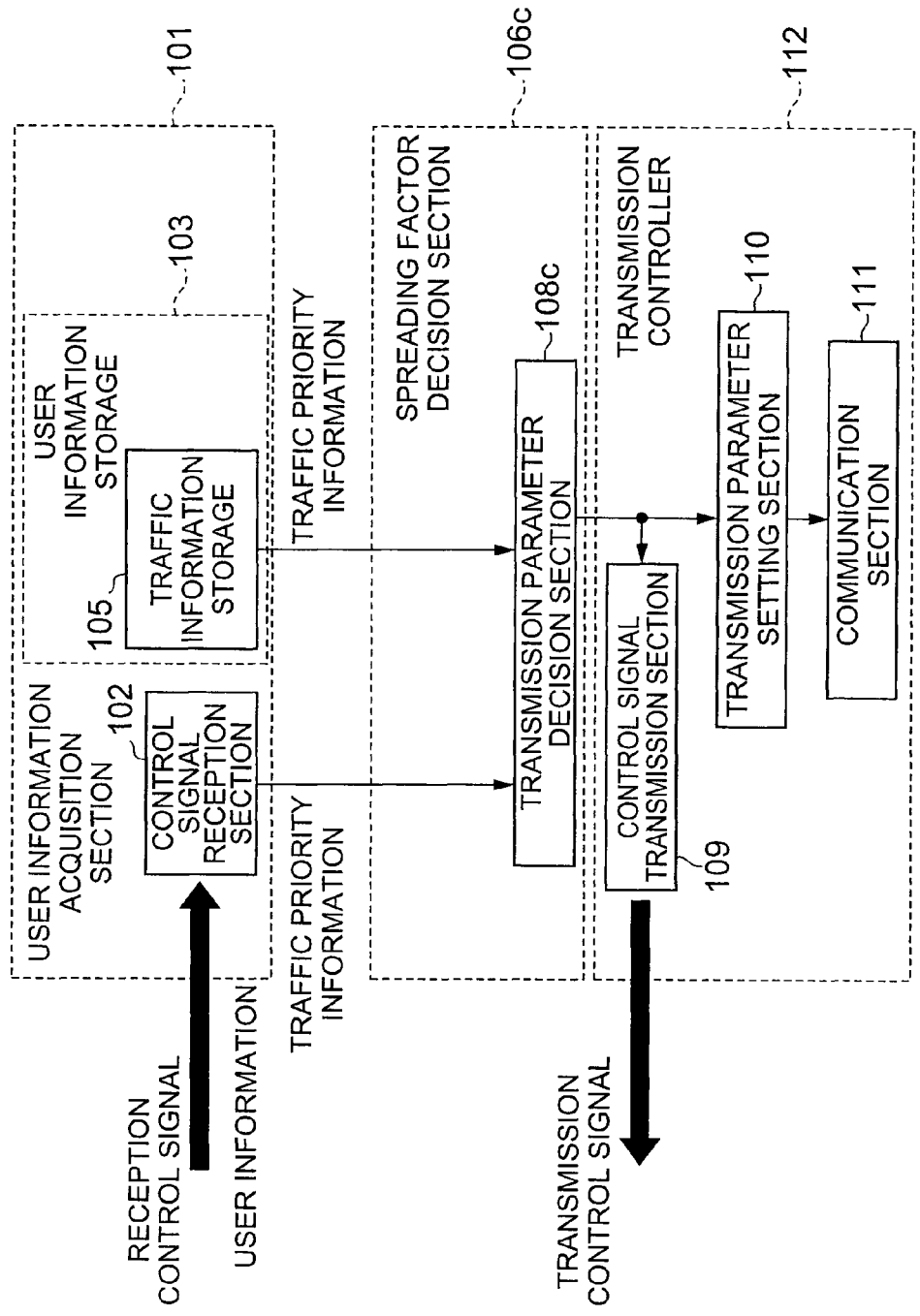
FIG. 13 is a block diagram of a radio communication control apparatus 100c according to a fifth embodiment.

Next, a radio communication control apparatus according to a fifth embodiment will be described. A radio communication control apparatus 100c includes a feature of controlling a spreading factor according to a traffic type or a traffic priority, when performing simultaneous transmission and reception. First, the configuration of the above radio communication control apparatus 100c will be described. FIG. 13 is a block diagram of the radio communication control apparatus 100c. The above radio communication control apparatus 100c includes a user information acquisition section 101, a spreading factor decision section 106c and a transmission controller 112. The above user information acquisition section 101 (acquisition unit) includes a control signal reception section 102 and a user information storage 103 (a traffic information storage 105). Also, the spreading factor decision section 106c includes a transmission parameter decision section 108c (parameter decision unit). Further, the transmission controller 112 includes a control signal transmission section 109 (control signal transmission unit), a transmission parameter setting section 110 (parameter setting unit), and a communication section 111 (communication unit). The points of difference of the above radio communication control apparatus 100c from the radio communication control apparatus 100b according to the fourth embodiment are that the radio communication control apparatus 100c includes the traffic information storage 105, but does not include the radio spectrum environment measurement section 104. Hereinafter, the points of difference will be described.

The traffic information storage 105 is a portion which stores a traffic type (either data signal or control signal) or a traffic priority in regard to a transmission signal to be transmitted. Hereinafter, traffic priority information generically refers to the traffic type or the traffic priority.

Prior to the start of simultaneous transmission and reception, the transmission parameter decision section 108c in the spreading factor decision section 106c is a portion which fetches the traffic priority information stored in the traffic information storage 105 and the traffic priority information of the opposite party, received in the control signal reception section 102, and decides transmission parameters (spreading factor and transmission power), based on the traffic priority information of the transmission signals both the self-apparatus and the opposite party intend to transmit.

Here, similar to the fourth embodiment, according to the respective sets of traffic priority information of the transmission signals which both the radio communication control apparatus 100c and the radio communication control apparatus of the opposite party intend to transmit, it is possible to individually decide the spreading factor and the transmission power of the transmission signals both the radio communication control apparatus 100c and the opposite party intend to transmit.

Using the transmission parameters (spreading factor and transmission power) decided in the transmission parameter decision section 108c, the transmission parameter setting section 110 sets the transmission parameters, and the communication section 111 performs simultaneous transmission and reception. Meanwhile, the control signal transmission section 109 transmits the decided transmission parameters to the opposite party of the radio communication control apparatus 100c.

Figure 14:
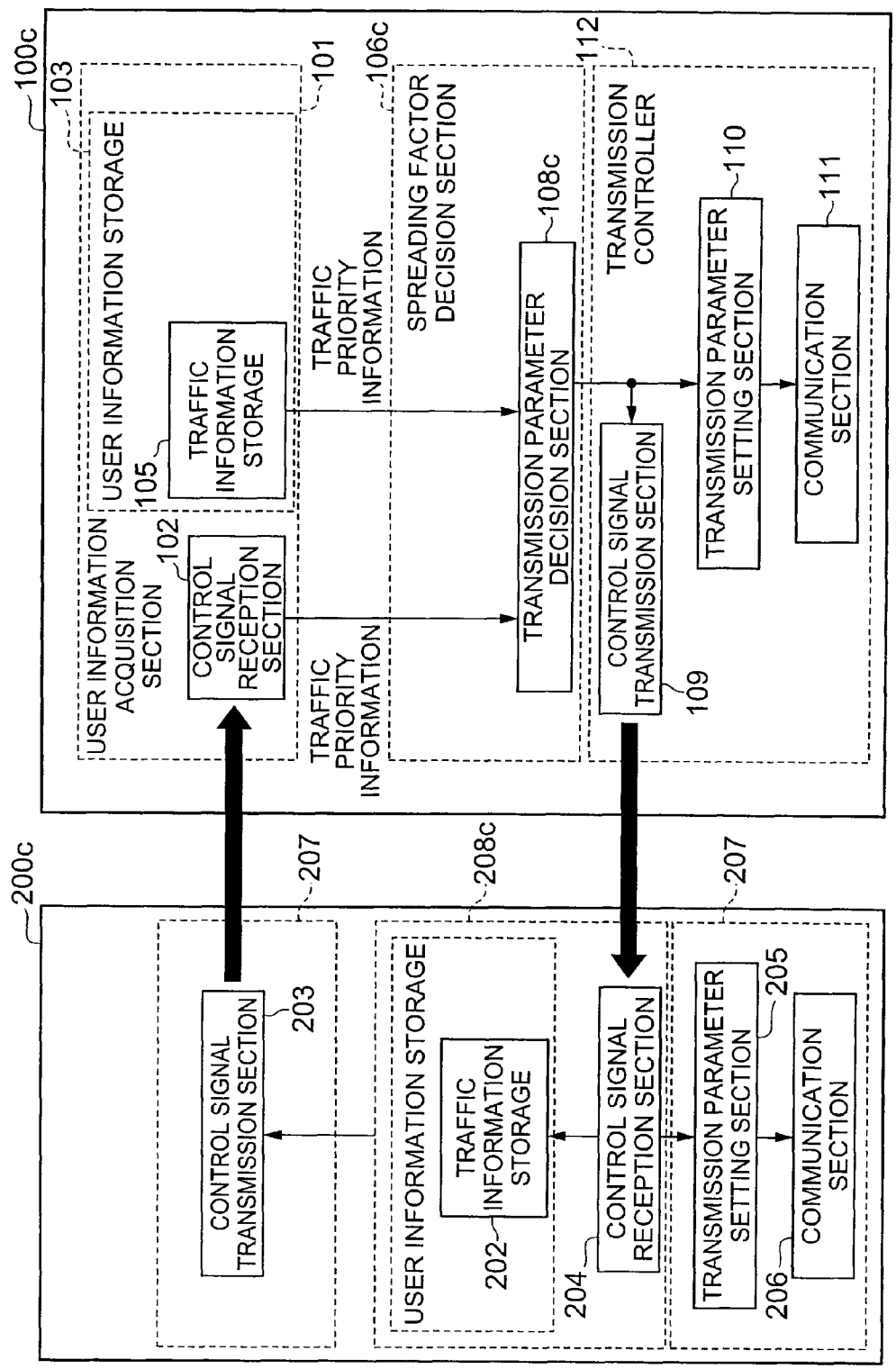
FIG. 14 is a block diagram of a radio communication control apparatus 200c according to the fifth embodiment.

Now, the radio communication control apparatus 200c, the opposite party thereof, will be described. FIG. 14 is a block diagram of the radio communication control apparatus 200c. The above radio communication control apparatus 200c includes a transmission controller 207 and a reception controller 208c. The above transmission controller 207 includes a control signal transmission section 203, a transmission parameter setting section 205 and a communication section 206. Also, the reception controller 208c includes a control signal reception section 204, and a traffic information storage 202 in the user information storage.

The point of difference of the above radio communication control apparatus 200c from the radio communication control apparatus 200 according to the fourth embodiment is that, the above radio communication control apparatus 200c includes the traffic information storage 202, in place of the radio spectrum environment measurement section 201. Hereinafter, a description will be given centering on the above point of difference.

The traffic information storage 202 is a portion which stores the traffic priority information indicative of the traffic type (data signal or control signal) or the traffic priority of a transmission signal to be transmitted.

Prior to simultaneous transmission and reception with the radio communication control apparatus 100c, the control signal transmission section 203 transmits the traffic priority information stored in the traffic information storage 202, to the radio communication control apparatus 100c.

With such the configuration, the radio communication control apparatus 200c can transmit the traffic priority information to the radio communication control apparatus 100c.

Figure 15:
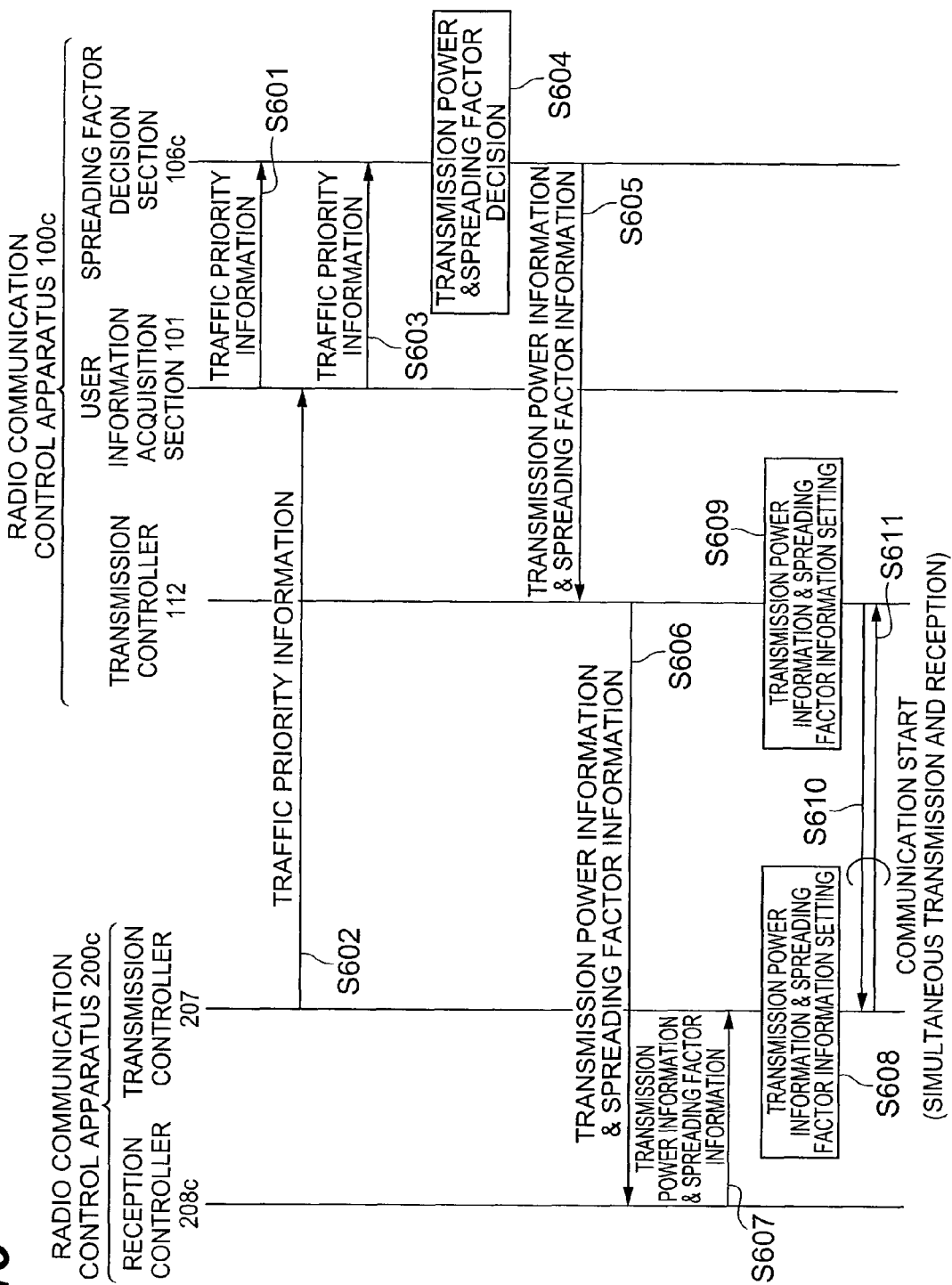
FIG. 15 is a sequence diagram illustrating the operation of the radio communication control apparatuses 100c and 200c.

Next, the operation of the radio communication control apparatuses 100c and 200c according to the present embodiment will be described. FIG. 15 is a sequence diagram illustrating the operation of the radio communication control apparatuses 100c and 200c.

First, when a user instructs to start simultaneous transmission and reception, the radio communication control apparatus 100c outputs the traffic priority information stored in the traffic information storage 105, to the spreading factor decision section 106c (S601).

In parallel to the above output processing, the radio communication control apparatus 200c transmits traffic priority information indicative of a traffic type (control signal or data signal) or a data type (voice, video or other packets) to the radio communication control apparatus 100c (S602). On receipt of the above information, the control signal reception section 102 in the radio communication control apparatus 200c outputs the above traffic priority information to the transmission parameter decision section 108c (S603).

When it is decided to be data having a high priority, the transmission parameter decision section 108c decides transmission parameters to increase the transmission power and the spreading factor (S604). Then, the transmission parameter decision section 108c outputs the decided transmission parameters to both the control signal transmission section 109 in the transmission controller 112 and the transmission parameter setting section 110 (S605).

The control signal transmission section 109 then transmits the decided transmission parameters (transmission power information and spreading factor information) to the radio communication control apparatus 200c (S606). Also, the transmission parameter setting section 110 sets the transmission parameters to increase the transmission power and the spreading factor (S609). When the transmission parameters are decided so as to increase the transmission power, the transmission power in the radio communication control apparatus 100c is increased, and accordingly, the radio communication control apparatus 100c comes to receive a large influence of coupling loop interference produced by the simultaneous transmission and reception. As a result, the radio spectrum environment information (SINR) of the signal transmitted from the radio communication control apparatus 200c to the radio communication control apparatus 100c is decreased. To cope with this, the transmission parameter decision section 108c decides so as to increase the spreading factor in the transmission parameters of the radio communication control apparatus 200c. Thus, it becomes possible to improve communication quality while suppressing the influence of the coupling loop interference. Contrary to the above, it may also be possible to control to reduce the spreading factor when the transmission power is decreased, so that the reduction of information transmission speed is prevented. As a result, it is possible to improve data signal throughput without degrading a signal error rate performance, such as a control signal of which error is not tolerable.

On receiving the transmission power information and the spreading factor information, the control signal reception section 204 in the radio communication control apparatus 200c outputs the above received information to the transmission parameter setting section 205 (S607). The transmission parameter setting section 205 sets the transmission parameters based on the output transmission power information and the spreading factor information (S608). Then, both the communication section 206 in the radio communication control apparatus 200c and the communication section 111 in the radio communication control apparatus 100c can perform simultaneous transmission and reception using the same frequency, with appropriate transmission parameters (S610, S611).

Now, the functions and effects of the radio communication control apparatus 100c according to the fifth embodiment will be described. In the above radio communication control apparatus 100c, the control signal reception section 102 acquires the traffic priority information indicative of the priority of the transmission signal in the radio communication control apparatus 200c, and the traffic information storage 105 stores the traffic priority information of the self-apparatus. Then, based on the above traffic priority information, the transmission parameter decision section 108c can decide the spreading factor in the transmission signal among the transmission parameters. Thereafter, the control signal transmission section 109 transmits the decided transmission parameters to the radio communication control apparatus 200c, and the transmission parameter setting section 110 sets the decided transmission parameters. Using the set transmission parameters, the communication section 111 can perform simultaneous transmission and reception using the same frequency with the radio communication control apparatus 200c. As a result, it is possible to set the transmission parameters depending on to what degree the transmission signal requires reliability, according to the traffic priority information indicative of the type or the priority of the transmission signal. Also, it is possible to reduce coupling loop interference at the time of the simultaneous transmission and reception using the same frequency, and to prevent degradation of the received signal quality.

Additionally, it may also be possible to combine with the radio spectrum environment information described in the fourth embodiment. In the above case, preferably, the transmission parameters are decided according to both the traffic priority information and the radio spectrum environment information. For example, when the traffic priority is high, and the radio spectrum environment information such as SINR is not greater than a predetermined value, preferably, the transmission parameters are set so as to increase the spreading factor, etc. to a predetermined value or greater.

What is claimed is:

1. A radio communication control apparatus comprising:
   a control signal reception unit for receiving control signal from a communication terminal, being an opposite party of communication;
   a simultaneous transmission and reception determination unit for determining whether or not it is possible to perform simultaneous transmission and reception with the communication terminal using the same frequency, based on the control signal received by the control signal reception unit;
   a control signal transmission unit for transmitting instruction information indicating that the simultaneous transmission and reception are possible, when the simultaneous transmission and reception with the communication terminal using the same frequency are determined to be possible by the simultaneous transmission and reception determination unit, and for transmitting instruction information indicating that the simultaneous transmission and reception are impossible, when the simultaneous transmission and reception with the communication terminal using the same frequency are determined to be impossible; and
   a communication unit for executing the simultaneous transmission and reception with the communication terminal using the same frequency, when the simultaneous transmission and reception using the same frequency are determined to be possible by the simultaneous transmission and reception determination unit, and for performing communication processing other than the simultaneous transmission and reception with the communication terminal, when the simultaneous transmission and reception using the same frequency are determined to be impossible.

2. The radio communication control apparatus according to claim 1, further comprising:
   a parameter decision unit for deciding a transmission parameter suitable for simultaneous transmission and reception using the same frequency, when the simultaneous transmission and reception using the same frequency are determined to be possible by the simultaneous transmission and reception determination unit, and for deciding a transmission parameter suitable for communication processing other than the simultaneous transmission and reception using the same frequency, when the simultaneous transmission and reception using the same frequency are determined to be impossible by the simultaneous transmission and reception determination unit; and
   a parameter setting unit for setting the transmission parameter decided by the parameter decision unit,
   wherein the control signal transmission unit transmits to the communication terminal the transmission parameter decided by the parameter decision unit together with instruction information indicating whether or not the simultaneous transmission and reception are possible, and
   wherein the communication unit performs either simultaneous transmission and reception using the same frequency or communication processing other than the simultaneous transmission and reception using the same frequency, using the transmission parameter decided by the parameter decision unit.

3. The radio communication control apparatus according to claim 1,
   wherein the simultaneous transmission and reception determination unit determines that the simultaneous transmission and reception are possible when radio spectrum environment information is not smaller than a predetermined value, and determines that the simultaneous transmission and reception are impossible when the radio spectrum environment information is smaller than the predetermined value.

4. The radio communication control apparatus according to claim 1,
   wherein the simultaneous transmission and reception determination unit determines that the simultaneous transmission and reception are possible when radio spectrum environment information is not smaller than a predetermined value, and further determines whether a transmission signal is a data signal or a control signal when the radio spectrum environment information is smaller than the predetermined value, and determines that the simultaneous transmission and reception are possible, on determining that the transmission signal is a data signal, and determines that the simultaneous transmission and reception are impossible, on determining that the transmission signal is not a data signal.

5. The communication apparatus according to claim 1,
   wherein the simultaneous transmission and reception determination unit determines whether or not the simultaneous transmission and reception are possible, based on an evaluation value calculated by multiplying radio spectrum environment information, transmission signal type, and data transmission priority information by respective predetermined coefficients, and by mutually adding.

6. A radio communication control method comprising:
- a control signal reception step for receiving control signal from a communication terminal, being an opposite party of communication;
- a simultaneous transmission and reception determination step for, based on the control signal received in the control signal reception step, determining whether or not it is possible to perform simultaneous transmission and reception with the communication terminal using the same frequency;
- a control signal transmission step for transmitting, to the communication terminal, instruction information indicating that the simultaneous transmission and reception are possible, when the simultaneous transmission and reception with the communication terminal using the same frequency are determined to be possible in the simultaneous transmission and reception determination step, and for transmitting, to the communication terminal, instruction information indicating that the simultaneous transmission and reception are impossible, when the simultaneous transmission and reception using the same frequency are determined to be impossible; and
- a communication step for executing the simultaneous transmission and reception with the communication terminal using the same frequency, when the simultaneous transmission and reception using the same frequency are determined to be possible in the simultaneous transmission and reception determination step, and for performing communication processing other than the simultaneous transmission and reception with the communication terminal, when the simultaneous transmission and reception using the same frequency are determined to be impossible.

* * * * *